(12) United States Patent
Sederberg et al.

(10) Patent No.: US 7,487,930 B2
(45) Date of Patent: *Feb. 10, 2009

(54) LUBRICATING SYSTEM FOR METAL-DEMOLITION SHEARS

(75) Inventors: Clayton P. Sederberg, Duluth, MN (US); Michael W. Swanson, Two Harbors, MN (US)

(73) Assignee: The Stanley Works, New Britain, CT (US)

( * ) Notice: Subject to any disclaimer, the term of this patent is extended or adjusted under 35 U.S.C. 154(b) by 383 days.

This patent is subject to a terminal disclaimer.

(21) Appl. No.: 11/068,041

(22) Filed: Mar. 1, 2005

(65) Prior Publication Data

US 2006/0006261 A1   Jan. 12, 2006

Related U.S. Application Data

(63) Continuation-in-part of application No. 10/886,052, filed on Jul. 8, 2004, now Pat. No. 7,240,869.

(51) Int. Cl.
*B22C 19/00* (2006.01)
(52) U.S. Cl. .................................. 241/101.73; 241/266
(58) Field of Classification Search ............ 241/101.73, 241/266
See application file for complete search history.

(56) References Cited

U.S. PATENT DOCUMENTS

| | | | |
|---|---|---|---|
| 4,384,599 A | 5/1983 | Dagenais |
| 4,462,439 A | 7/1984 | Dagenais |
| 4,558,515 A | 12/1985 | LaBounty |
| 4,771,540 A | 9/1988 | LaBounty |
| 4,903,408 A | 2/1990 | Tagawa et al. |
| 5,113,733 A | 5/1992 | Peterson et al. |
| 5,127,567 A | 7/1992 | LaBounty et al. |
| 5,230,151 A | 7/1993 | Kunzman et al. |
| 5,384,962 A | 1/1995 | Pemberton |

(Continued)

FOREIGN PATENT DOCUMENTS

EP    0 353 363    2/1990

(Continued)

OTHER PUBLICATIONS

International Search Report issued for PCT Application No. PCT/US2005/023942, dated Oct. 28, 2005.

(Continued)

*Primary Examiner*—Faye Francis
(74) *Attorney, Agent, or Firm*—Pillsbury Winthrop Shaw Pittman LLP

(57) ABSTRACT

A lubricating system for a heavy-duty metal demolition shears provides lubricant to one of more wear surfaces on one or more wear portions in the shears. The system includes a hydraulic lubricant pump that is actuated by the main hydraulic control system by means of which the jaws of the shears are opened and closed, and may include a sequential valve to distribute lubricant to various wear portions in sequential fashion. The lubricating system may lubricate one or more wear surfaces of the lateral blade stabilizers, primary and secondary blade(s) on the upper and/or lower jaws, pivotal connections between jaws and/or between the upper jaw and the hydraulic cylinder, and a forward wear plate. The lubricating system may be retrofitted onto a conventional non-lubricated shears by replacing a conventional upper jaw with a lubricated upper jaw and lubricating system.

22 Claims, 24 Drawing Sheets

U.S. PATENT DOCUMENTS

| | | |
|---|---|---|
| 5,715,603 A | 2/1998 | Dorguin |
| 5,769,341 A | 6/1998 | Morikawa et al. |
| 5,992,023 A | 11/1999 | Sederberg et al. |
| 6,061,911 A | 5/2000 | LaBounty et al. |
| 6,119,970 A | 9/2000 | LaBounty et al. |
| 7,240,869 B2 * | 7/2007 | Sederberg et al. ...... 241/101.73 |

OTHER PUBLICATIONS

"HTL 429 Pump and Electric FlowMaster © Pump", Solutions, The Latest Products and News for Lincoln Customers, Apr. 2003, vol. 5, No. 2, pp. 1-2.

"Construction's Best Lubrication Solutions", Capabilities, Information From the Leader in the Lubrication Industry, pp. 3-10, no date available.

"Vogel Centralized Lubrication", www.vogelag.com, Feb. 2004.

"Hydralube Lubrication Pump", Interlube, Leaders in Lubrication Solutions, no date available.

"Light Hydraulic Breakers", AtlasCopco, pp. 3-7, no date available.

HP Series Hydraulic Breakers, Indeco, Your Partners in Demolition, no date available.

"Pulverizers Range", Indeco, Your Partners in Demolition, no date available.

"360 Degrees Lubricating Grease System and Fitted with Semi-Self Lubricating Bushes", A-Ward Attachments, www.a-ward.co.nz/pdfs/Re-barShear17Feb05v1.pdf.

Stanley Hydraulic Auto Lube Pump Installation, Operation & Maintenance Manual, pp. 1-12, Form 44869, May 2001.

* cited by examiner

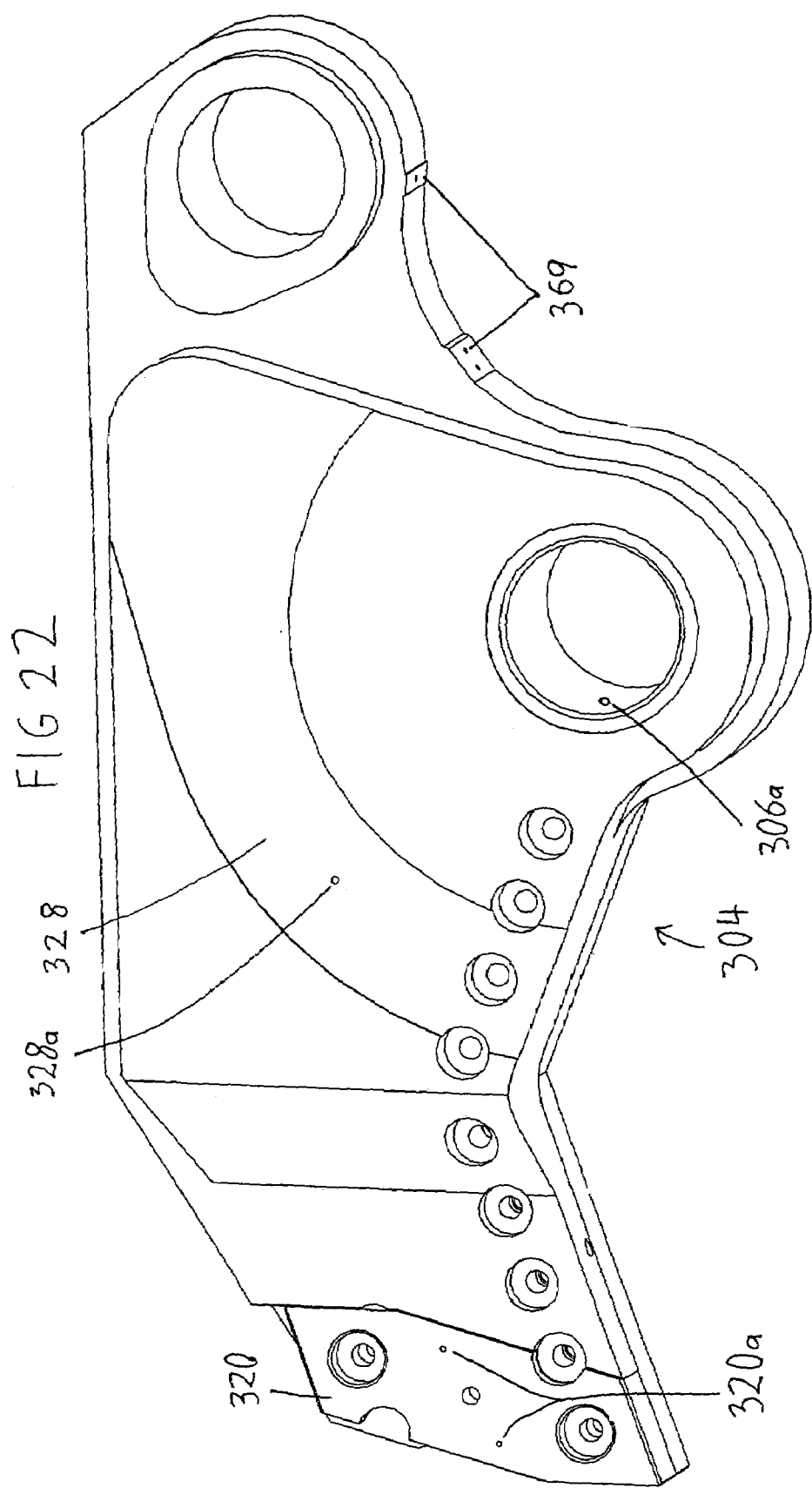

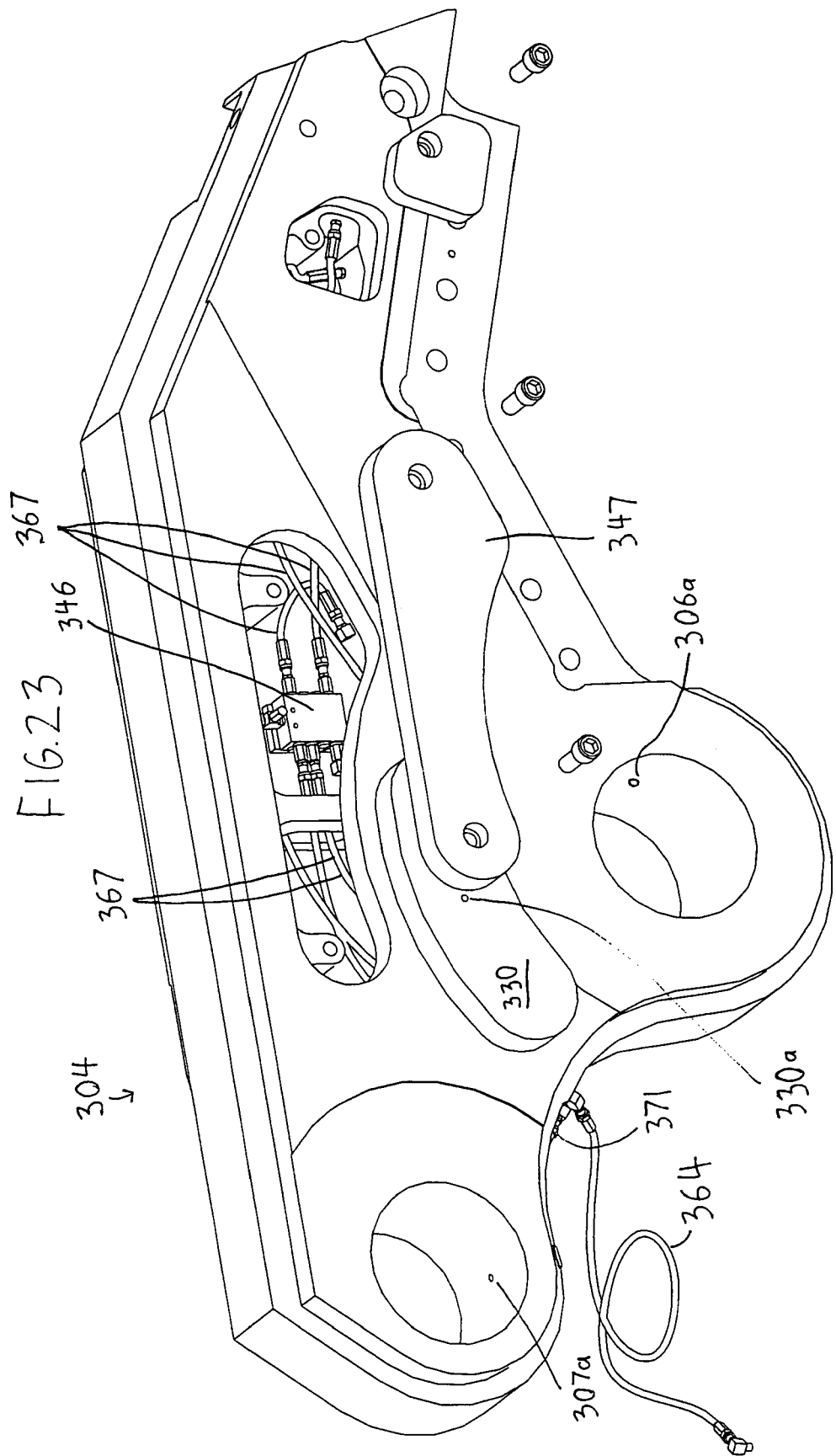

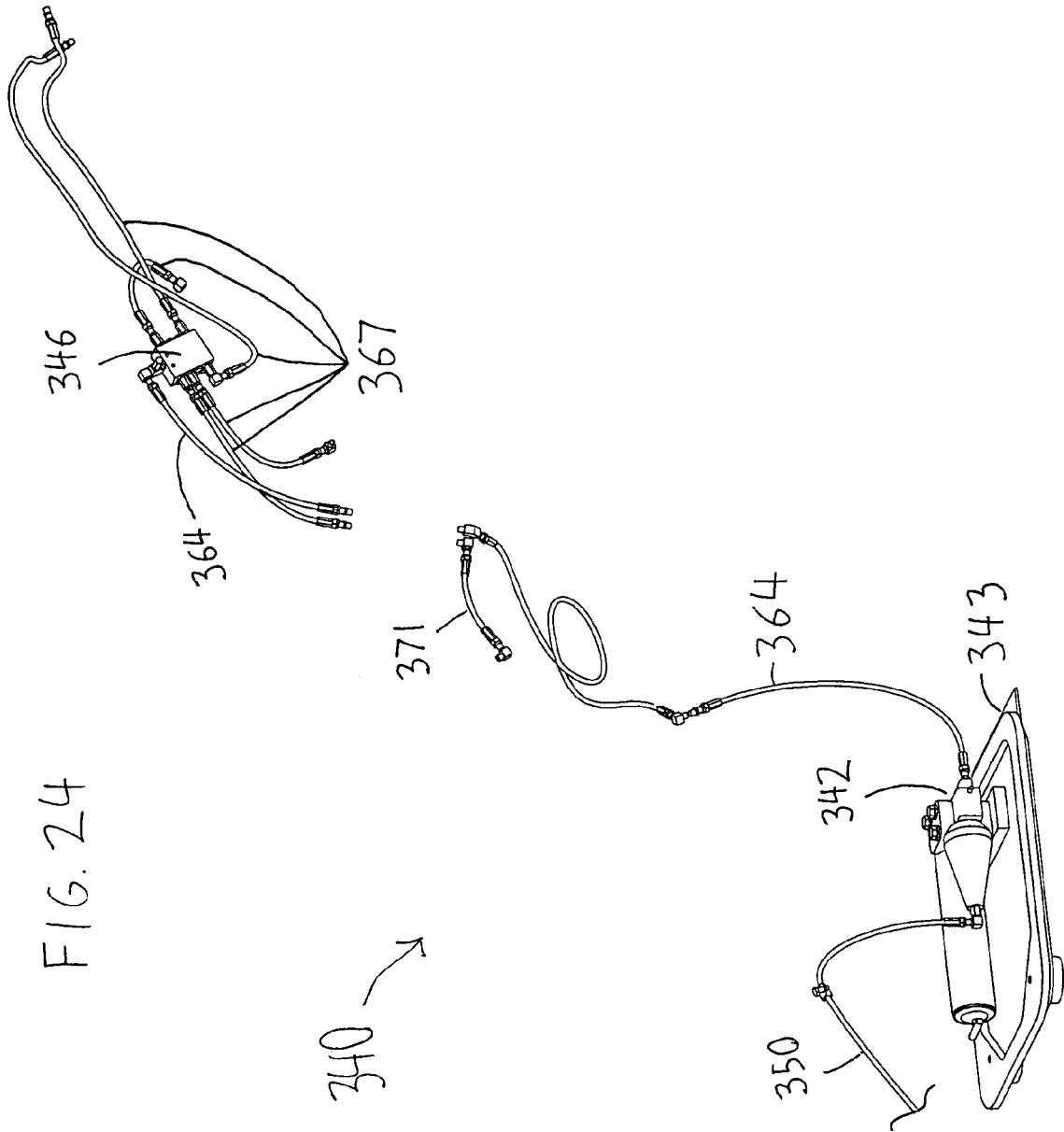

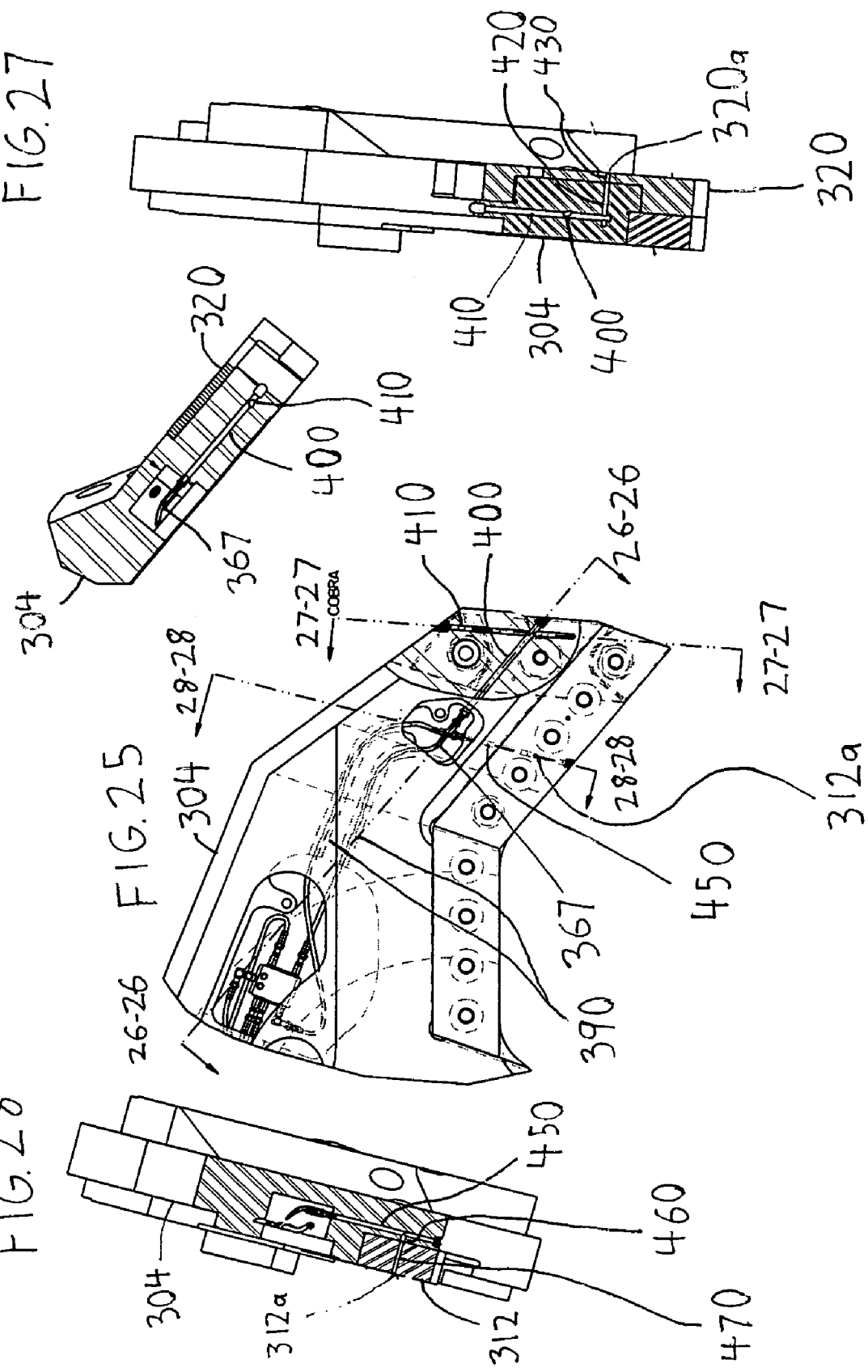

LUBRICATING SYSTEM FOR METAL-DEMOLITION SHEARS

CROSS-REFERENCE

This application is a continuation-in-part of application Ser. No. 10/886,052, now U.S. Pat. No. 7,240,869, entitled "LUBRICATING SYSTEM FOR METAL-DEMOLITION SHEARS," filed Jul. 8, 2004, the contents of which are incorporated herein by reference in their entirety.

FIELD OF THE INVENTION

The invention relates to heavy-duty machinery having wear parts with wear surfaces that need to be lubricated. More particularly, the invention relates to heavy-duty metal demolition shears and demolition attachments such as multi-jaw processors used in concrete and steel processing and demolition.

BACKGROUND OF THE INVENTION

As illustrated in FIGS. 1 and 2, in general, a heavy-duty metal demolition shears 10 of the sort in which a lubricating system according to the invention may be incorporated has a stationary lower jaw 12 and an upper jaw 14 that pivots about a pivot structure 16 to open and close. A hydraulic cylinder 18 drives the upper jaw 14 to open and close the shears 10. The shears 10 includes upper primary and secondary blade insert members 20 and 22, respectively, attached to seating surfaces on the upper jaw 14, and lower primary and secondary blade insert members 24 and 26, respectively, attached to seating surfaces on the right-hand lower jaw side plate 12b. The blade insert members 20-26 cooperate to cut material being processed with the shears 10 in shearing fashion. The lower jaw includes tow sides and an end plate. The blade side is often referred to as the "cutting side," the opposite side, with the guide blade, is often referred to as the "guide side," and the end plate is often referred to as the "cross plate."

As the shears cut a workpiece, the upper jaw 14 may be deflected somewhat laterally due to the fact that the lines along which cutting forces are applied to a workpiece by the lower and upper jaws 12, 14 are slightly offset with respect to each other. Therefore, a heavy-duty demolition shears may include a wear guide or guide blade 28 attached to a seating surface formed along a slot-facing surface of the left-hand (guide side) lower jaw side plate 12a and a wear plate 30 that is attached to a lateral surface of a front or nose portion of the upper jaw.

Additionally, it is known in the art to provide one or more lateral blade stabilizers (not included in the prior art shears illustrated in FIGS. 1 and 2) that are positioned on either side of the upper jaw, generally near the pivot structure.

As the shears 10 operates, these various wear components, which present various wear surfaces, slide past each other—blade insert members past blade insert members, the wear plate past the guide blade, and the upper jaw past the lateral blade stabilizers. As they do so, they can wear each other down. Accordingly, it is known to lubricate the various wear surfaces that make sliding contact with each other. Traditionally, such lubrication has been done manually. That, however, necessitates stopping operation of the shears, which reduces productivity.

BRIEF SUMMARY OF THE INVENTION

One or more embodiments of the present invention provides a lubricating system for a metal demolition shears that lubricates one or more of the various wear surfaces. A lubricating system according to the invention may be configured to do so automatically with each cycle of the upper jaw opening and closing. Additionally, where multiple wear surfaces are lubricated, a lubricating system according to the invention may be configured such that the various wear surfaces are lubricated in sequential order. A lubricating system according to the invention thus keeps the various wear parts properly lubricated, thereby extending their service life, while eliminating the need for the operator to stop operations in order to lubricate the wear parts.

One aspect of an embodiment of the present invention provides a metal demolition shears. The shears include a lower jaw and an upper jaw pivotally connected to the lower jaw. The shears also include a first wear portion having a first wear surface, and a second wear portion having a second wear surface. The first and second wear surfaces make sliding or shearing contact with each other as the upper jaw pivots relative to the lower jaw during operation of the shears. The shears also include a lubricating system that supplies lubricant to the first wear surface. The lubricating system includes a lubricant pump and a lubricant output conduit extending from the lubricant pump to the first wear surface through the first wear portion.

The shears may also include a hydraulic cylinder pivotally connected to the upper jaw to drive the upper jaw relative to the lower jaw. The first wear portion may define a portion of the pivotal connection between the hydraulic cylinder and the upper jaw.

The first wear portion may be disposed on the upper or lower jaws or on the body of the shears.

The lubricant output conduit may include a lubricant distributor valve disposed within the upper jaw. The shears may further include a third wear portion having a third wear surface, and a fourth wear portion having a fourth wear surface. The third and fourth wear surfaces make sliding or shearing contact with each other as the upper jaw pivots relative to the lower jaw during operation of the shears. The third wear portion may be disposed on the upper jaw. The lubricant output conduit extends from the lubricant pump to the third wear surface through the third wear portion. The lubricant distributor valve distributes lubricant from the pump to the first and third wear portions.

The lubricated wear portions may include any combination of one or more of the following portions of the shears: a portion of the upper jaw that defines pivotal connection between the upper and lower jaws, a portion of the upper jaw that defines a pivotal connection between the upper jaw and a hydraulic cylinder, a lateral wear portion on the upper jaw that is configured to transfer lateral loads to a lateral blade stabilizer mounted to the lower jaw, and a blade on the upper jaw, among others.

The lubricant pump may be disposed in a body of the shears. The lubricant output conduit may include a flexible line that extends from the pump into the upper jaw.

Another aspect of one or more embodiments of the present invention provides a method of making a lubricated shears. The method includes pivotally connecting a first upper jaw to a lower jaw. The first upper jaw includes a first wear portion that has a first wear surface that makes sliding or shearing contact with a second wear surface of a second wear portion as the first upper jaw pivots relative to the lower jaw during operation of the shears. The method also includes operatively connecting a lubricating system to the shears. The lubricating system is configured and disposed so as to supply lubricant to the first wear surface of the first wear portion. The lubricating system includes a lubricant pump and a lubricant output conduit extending from the lubricant pump to the first wear surface through the first wear portion.

According to a further aspect of one or more embodiments of the present invention, the method further includes detaching a second upper jaw from the lower jaw prior to pivotally connecting the first upper jaw to a lower jaw. Accordingly, the method can be used to quickly and efficiently retrofit a lubricated upper jaw onto a conventional non-lubricated shears.

Another aspect of one or more embodiments of the present invention provides a forward wear plate for use in a heavy-duty metal demolition shears having an upper jaw with a seating surface against which the wear plate is configured to be seated. The wear plate includes a body having a securing region that enables the wear plate to be secured in an operative position to the heavy-duty metal demolition shears. The wear plate also includes a lubricant conduit extending through the body and terminating at a wear surface of the wear plate. The lubricant conduit is positioned to mate with a corresponding lubricant supply conduit of the upper jaw. The wear plate may also include a lubricant dispersion groove formed along the wear surface and fluidly connected to the lubricant conduit. The wear plate may be configured such that it can be rotated by 180° about a central, transverse axis and reseated against the seating surface of the upper jaw. The securing region may include a bolt hole.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

These and other features of the invention will be described in greater detail below in connection with the FIGURES, in which:

FIG. 22 is a perspective view of a left side of an upper jaw of the shears in FIG. 20;

FIG. 23 is a partially-exploded, perspective view of the right side of the upper jaw in FIG. 22;

FIG. 24 is a perspective view of a lubricating system of the shears in FIG. 20;

FIG. 25 is a partial right side view of the upper jaw of the shears in FIG. 20;

FIG. 26 is a cross-sectional view of the upper jaw, taken along the line 26-26 in FIG. 25;

FIG. 27 is a cross-sectional view of the upper jaw, taken along the line 27-27 in FIG. 25; and FIG. 28 is a cross-sectional view of the upper jaw, taken along the line 28-28 in FIG. 25.

DETAILED DESCRIPTION OF THE INVENTION

Figure 1:
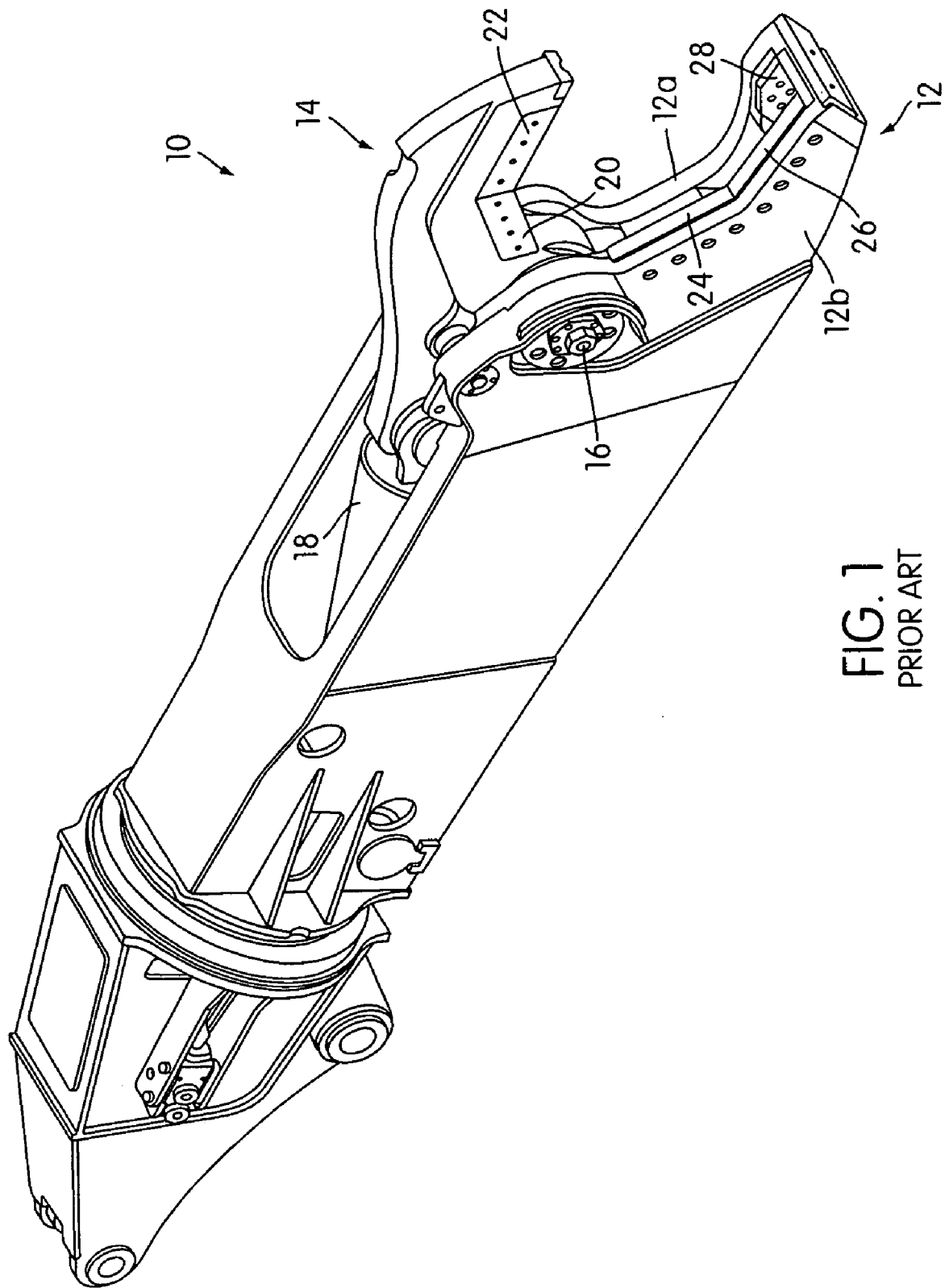
FIGS. 1 and 2 are perspective views from the right and left side, respectively, of a heavy-duty metal demolition shears according to the invention.
Figure 2:
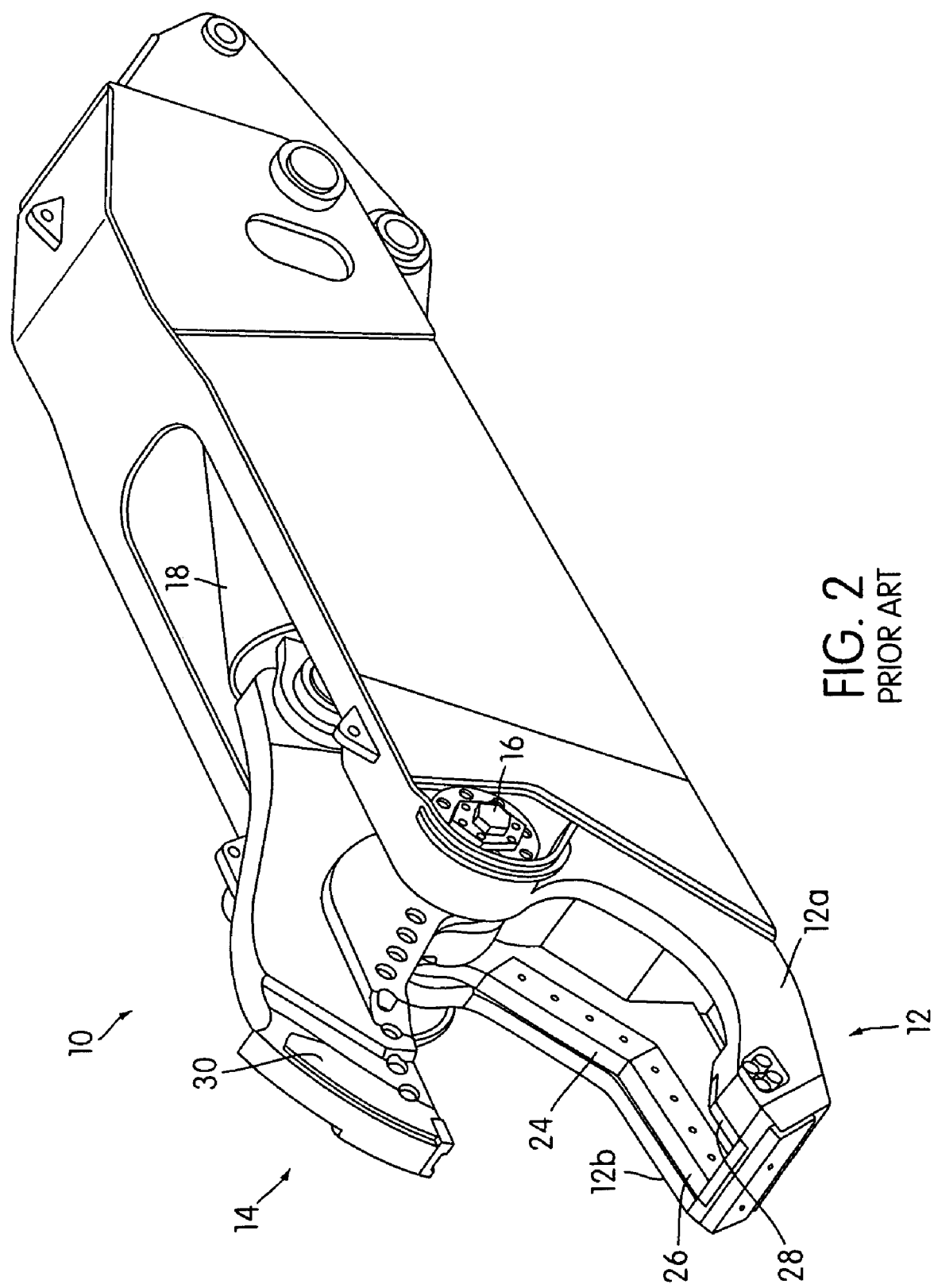
Figure 3:
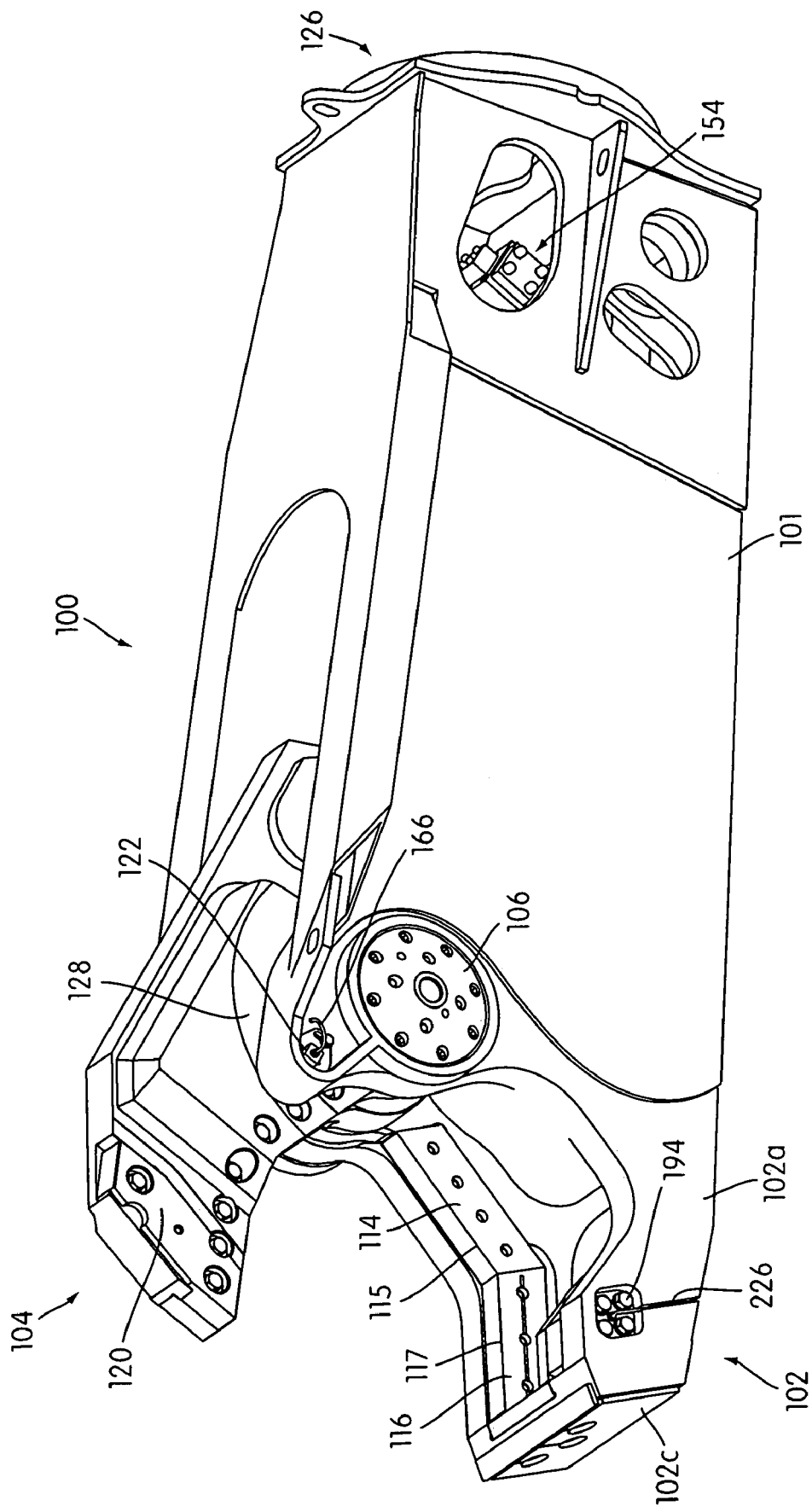
FIGS. 3-6 are perspective views illustrating a heavy-duty metal demolition shears incorporating a lubricating system according to the invention, with FIGS. 3 and 4 showing the shears open and FIGS. 5 and 6 showing the shears closed.

A metal demolition shears 100 that incorporates an embodiment of a lubricating system according to the invention is illustrated generally in FIGS. 3-6. The shears 100 has lower jaws 102 and upper jaws 104 that is pivotally connected to the lower jaws 102 by means of pivot structure 106. The lower jaw 102 includes left-hand lower jaw plate 102a, right-hand lower jaw plate 102b, and cross-member 102c interconnecting the two. The upper jaw 104 is driven to pivot open and closed relative to the lower jaw 102 by means of a hydraulic cylinder 108 (illustrated schematically in FIG. 10).

Upper primary and secondary blade insert members 110, 112, respectively, are secured to a blade seat portion of the upper jaw 104 and provide primary and secondary upper cutting edges 111, 113, respectively. Similarly, lower primary and secondary blade insert members 114, 116, respectively, are secured to seating surfaces formed along the right-hand lower jaw side plate 102b and provide primary and secondary lower cutting edges 115, 117, respectively.

A wear guide or guide blade 118 is attached to an inner, slot-facing seat formed along left-hand side plate 102a opposing the lower primary and secondary blade insert members, and a wear plate 120 is attached to a lateral surface at a front, nose portion of the upper jaw 104. The wear plate 120 may be configured as described in greater detail in co-pending U.S. application Ser. No. 10/697,554, entitled "METAL DEMOLITION SHEARS WITH INDEXABLE, INTEGRATED WEAR PLATE/PIERCING TIP" and filed on Oct. 31, 2003, the contents of which are incorporated by reference.

The shears 100 also includes a left-hand lateral blade stabilizer 122 and a right-hand lateral blade stabilizer 124. For the illustrated configuration, where primary shearing action occurs between the upper jaw 104 and the right-hand lower jaw plate 102b, the left-hand lateral blade stabilizer 122 is located above and forward of the pivot structure 106 (forward being taken to mean in a generally longitudinal direction, from the rear mounting adaptor portion of the shears 126 toward the jaws 102 and 104), and the right-hand lateral blade stabilizer 124 is located generally above and slightly behind the central axis of the pivot structure 106. As the upper jaw 104 pivots open and closed, depending on lateral forces on the upper jaw 104, the left-hand lateral blade stabilizer 122 will make sliding contact along an arcuate portion 128 on the left side of the upper jaw 104, and the right-hand lateral blade stabilizer 124 will make sliding contact along the surface of arcuate wear member 130, which may be formed as a distinct stand-off extending laterally from the surface of the upper jaw.

Figure 4:
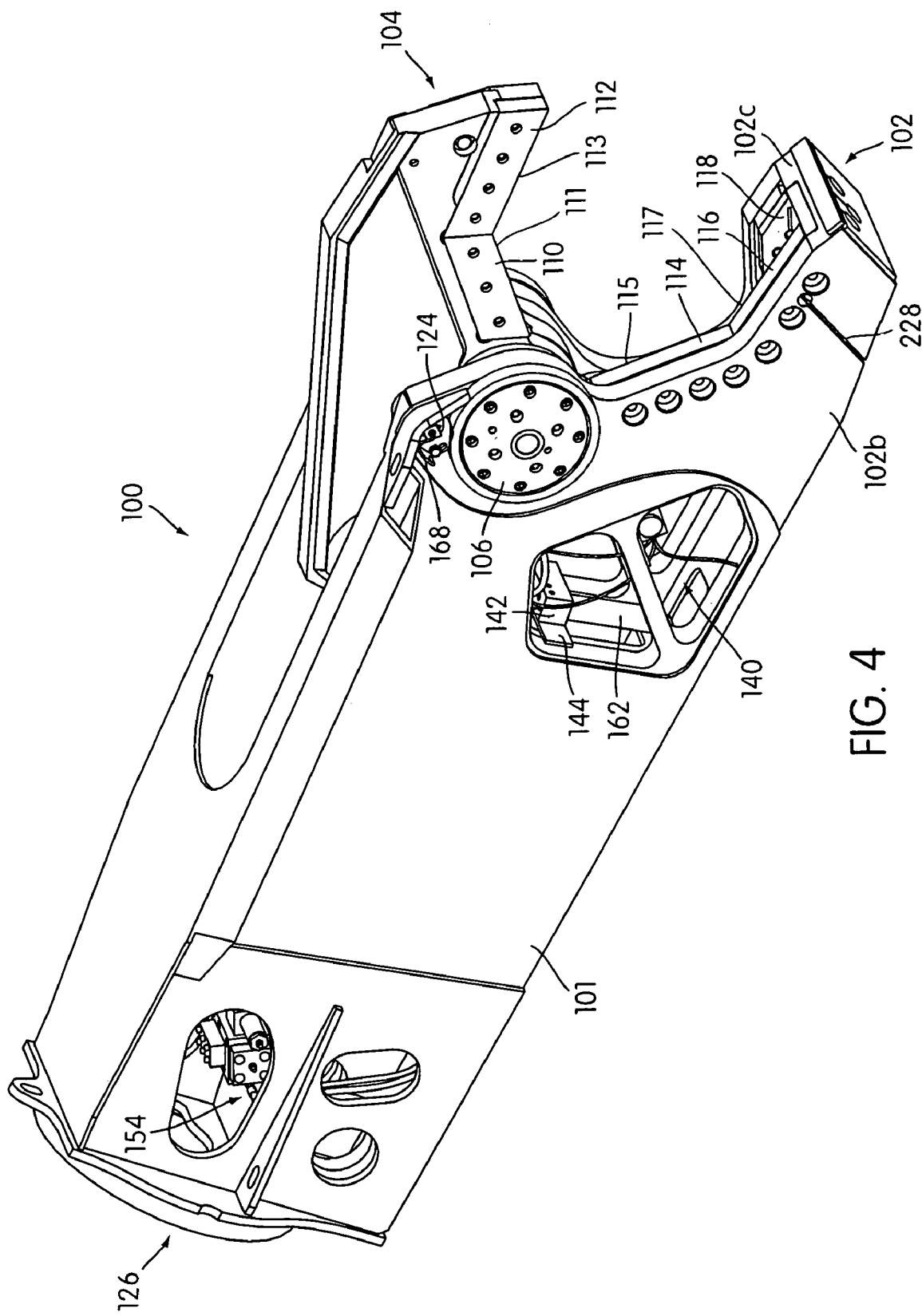
Figure 5:
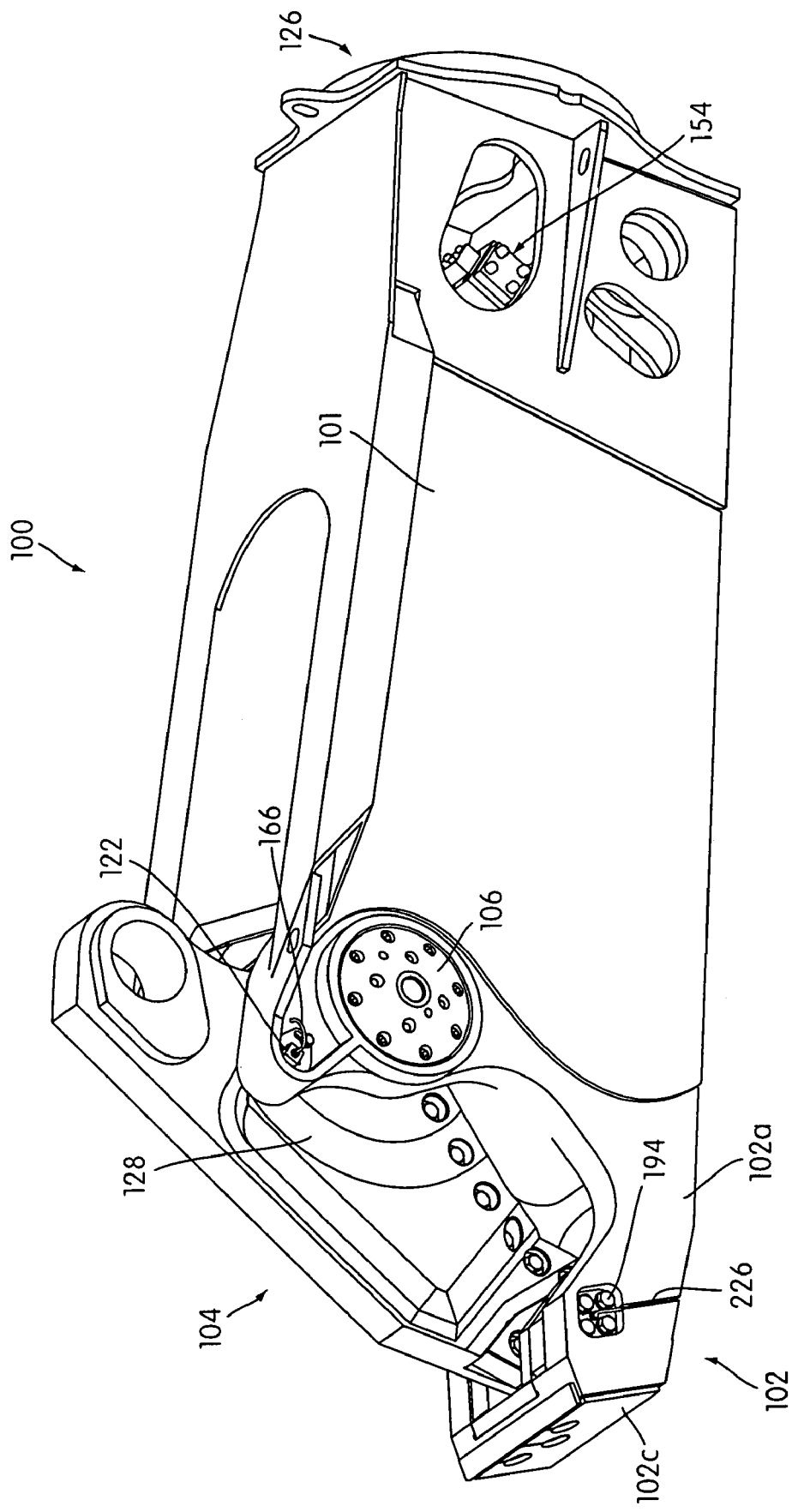
Figure 6:
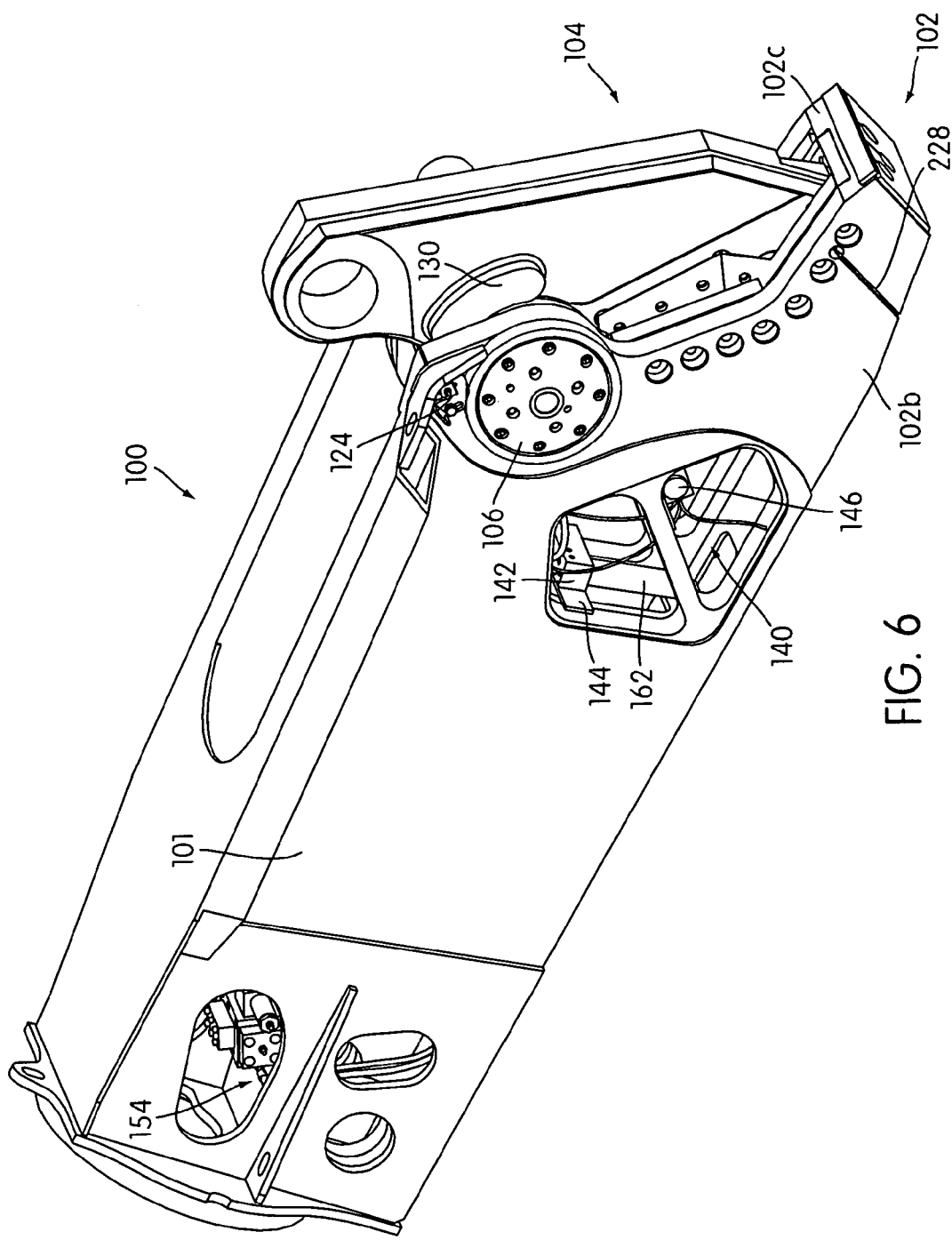

As is visible in FIGS. 4 and 6, and as illustrated in greater detail in FIGS. 7-10, a lubricating system 140 according to the invention is provided and supplies grease or other lubricant to one or more of the various wear parts. In the illustrated embodiment, the lubricating system provides lubricant to the guide blade 118, lower secondary cutting blade insert member 116, and left-hand and right-hand lateral blade stabilizers 122 and 124, but it is not necessary to supply lubricant to all such wear parts for a lubricating system to fall within the scope of the invention, or additional/other wear parts may also be provided with lubricant by means of a lubricating system as per the invention. (For example, the lower primary cutting blade insert member 114 could also be provided with lubricant according to the invention, so long as the more limited blade bypass associated with the primary cutting blades (as compared to the secondary cutting blades) is taken into consideration in positioning the lubricant dispersion grooves (described in detail below) along the faces of the blade insert members.). Any combination of one or more wear surfaces, cutting surfaces, pinned connections (e.g., pivot structure 106), stabilizing surfaces, and supporting surfaces on the lower or upper jaws 102, 104 may be lubricated without deviating from the scope of the present invention.

The lubricating system 140 includes a hydraulic lubricant pump 142 (e.g., a grease pump) that is supported within the generally box-form body of the shears "stick" structure 101, e.g., by means of a mounting bracket 144 used to secure the hydraulic lubricant pump 142 to an appropriate mounting point. The lubricant pump 142 may alternatively be mounted to any other suitable structure (e.g., outside of the shears structure 101, in or on the upper jaws 104, external to the shears 100, etc.). Additionally, the lubricating system 140 may include an SSV valve (sequential lubricant distributor) 146 that distributes grease or other lubricant to each of the various wear parts in sequential fashion. The SSV valve 146 is also mounted, e.g., by means of a mounting bracket 148, to an appropriate mounting point within the shears stick structure 101. The hydraulic lubricant pump 142 may, for example, be a model HTL429 Hydraulic Tool Lubricator, available from Stanley Hydraulic Tools or Lincoln Industrial Corporation, that is customarily used to lubricate the bushings of the tool bit in hydraulic hammers. Alternatively, it can be any other hydraulically actuated grease or lubricant pump. The SSV valve 146 may be a Divider Valve available from Lincoln Industrial.

Figure 9:
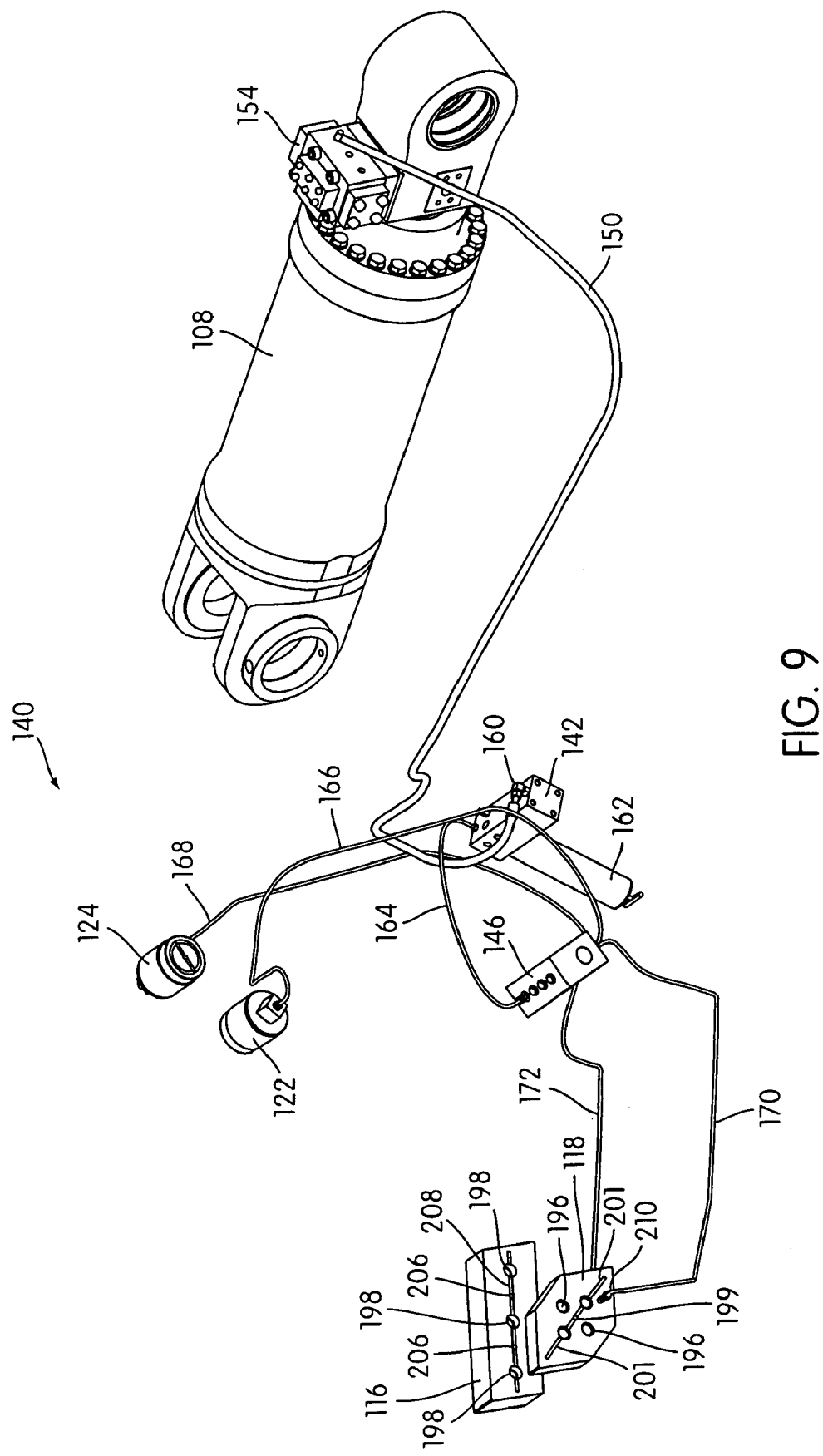
FIG. 9 is a perspective view illustrating just a lubricating system for use in a heavy-duty metal demolition shears as per the invention, along with various possible wear parts to which the lubricating system may be used to apply lubricant.
Figure 10:
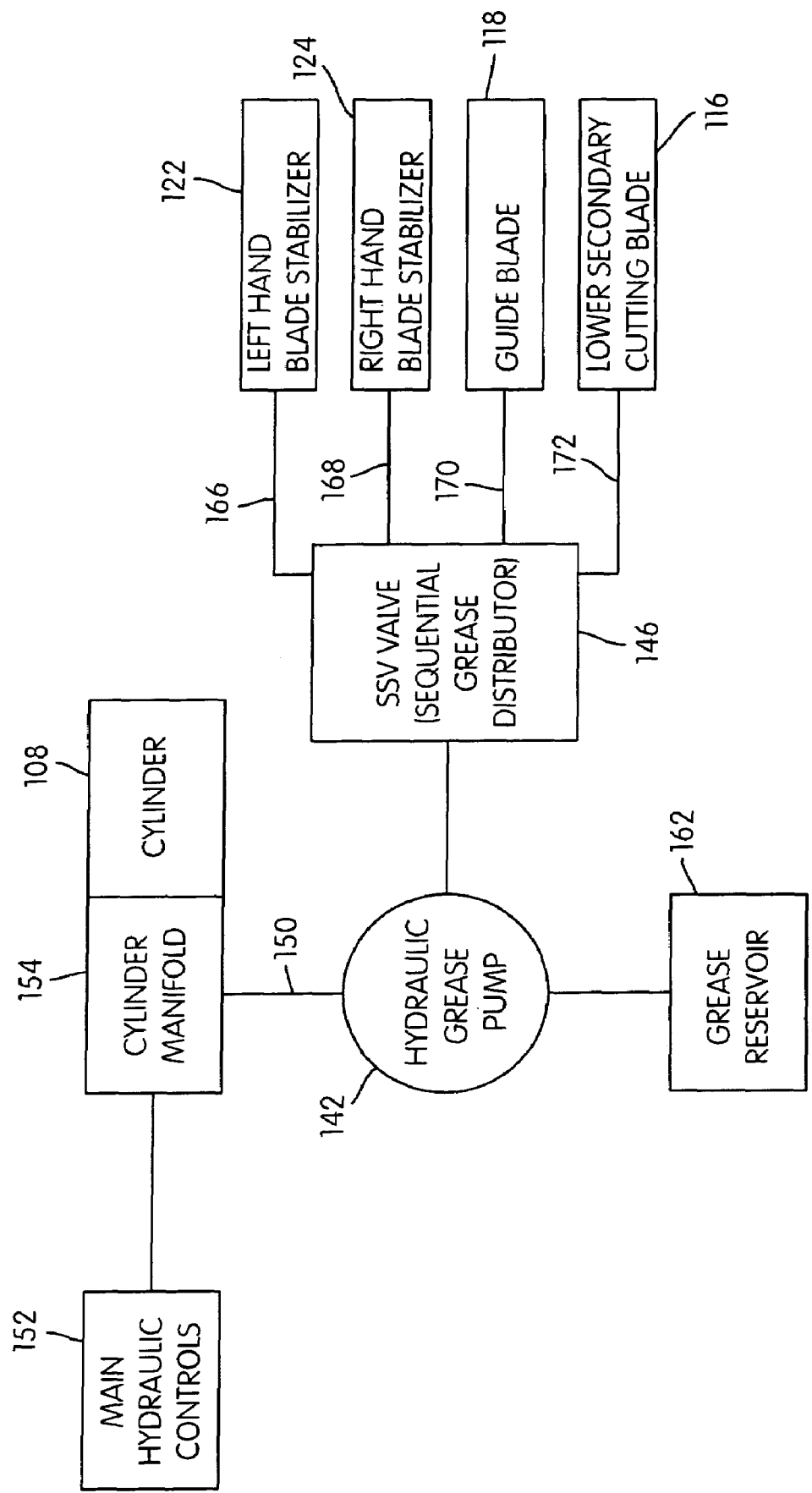
FIG. 10 is a schematic representation of the lubricating system and wear parts as illustrated in FIG. 9.

As illustrated in FIGS. 9 and 10, operation of the hydraulic lubricant pump 142 is controlled by a hydraulic control line 150. The hydraulic control line receives hydraulic fluid from hydraulic cylinder manifold 154, operation of which is regulated by main hydraulic controls unit 152. The hydraulic control line 150 is connected to the hydraulic lubricant pump 142, e.g., at hydraulic coupling 160.

A supply of lubricant is provided to the hydraulic lubricant pump 142 by means of a reservoir 162, e.g., a grease cartridge. The hydraulic lubricant pump 142 is configured such that each time the hydraulic control line 150 is pressurized, the hydraulic pump pumps a metered amount of lubricant, supplied by the reservoir 162, out along primary lubricant output line 164.

If only a single wear part is to be lubricated, the primary lubricant output line 164 may lead directly to a lubricant injection point configured to lubricate that wear part. Where multiple wear parts are to be lubricated, however, the primary lubricant output line 164 feeds lubricant to the SSV valve (sequential grease distributor) 146. The SSV valve 146 then feeds lubricant sequentially, with each cycle of operation of the pump 142, to the various individual lubricant output lines 166, 168, 170, and 172. As illustrated in FIGS. 9 and 10, the individual lubricant output lines 166, 168, 170, and 172 supply lubricant to the left-hand lateral blade stabilizer, the right-hand lateral blade stabilizer, the lower secondary cutting blade insert member 116, and the guide blade 118, respectively.

Further details of the various wear parts configured for use in a heavy-duty metal demolition shears that may be lubricated by means of a lubricating system according to the invention are illustrated in FIGS. 11-19.

Figure 11:
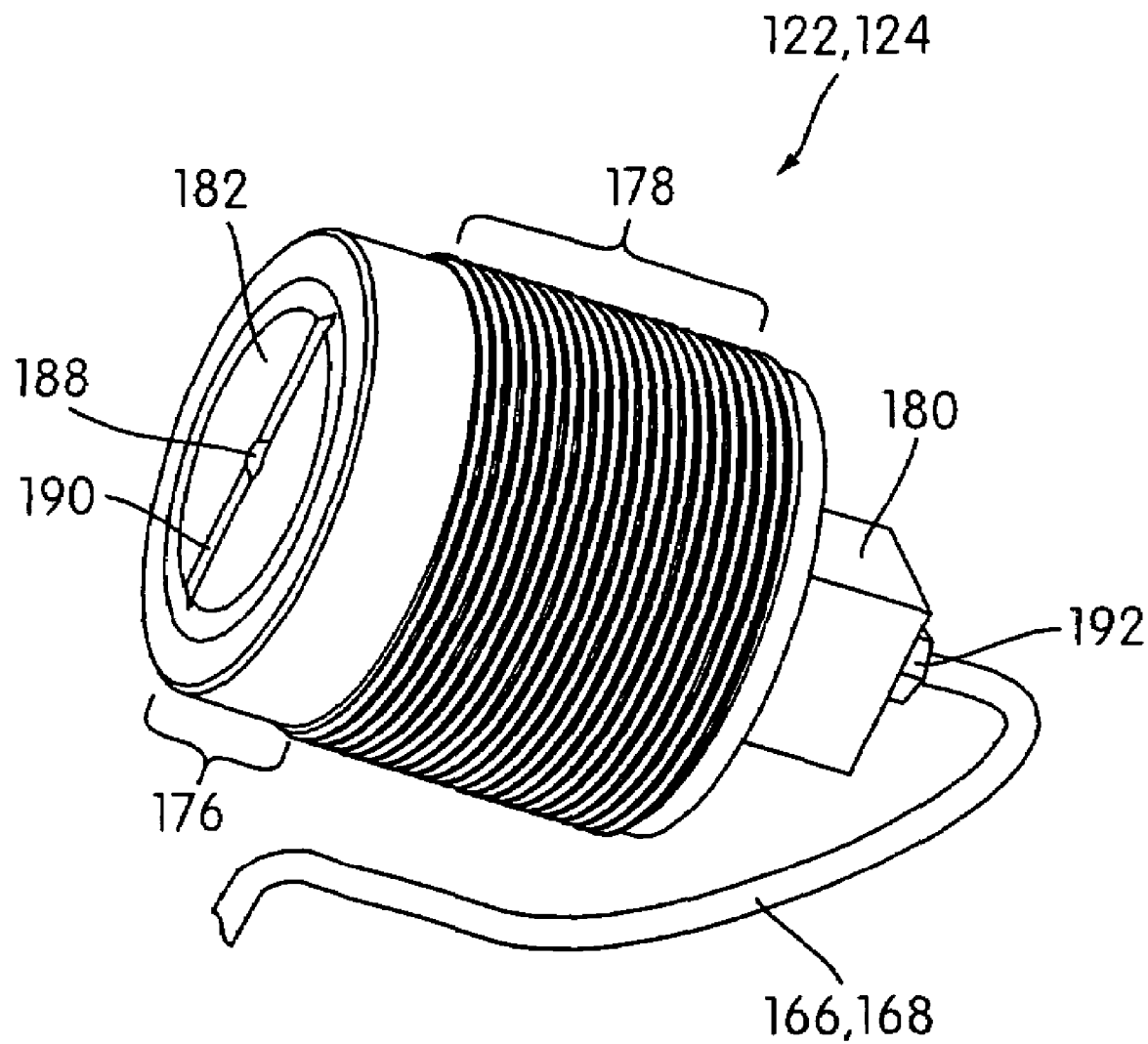
FIG. 11 is a perspective view illustrating a lateral blade stabilizer configured for use with a lubricating system according to the invention.
Figure 12:
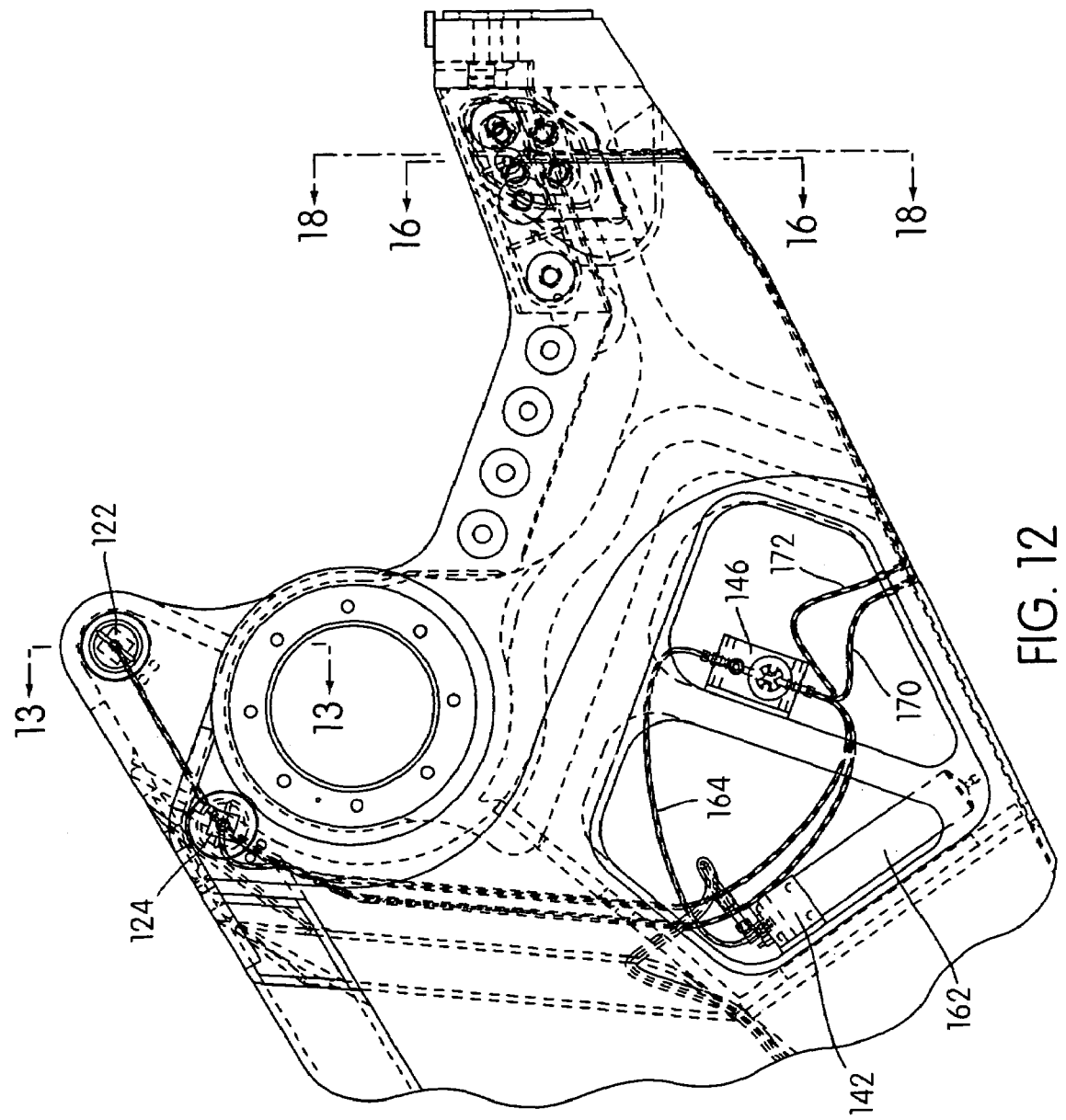
FIG. 12 is a partial plan view of the lower jaw assembly of a heavy-duty metal demolition shears incorporating a lubricating system according to the invention.
Figure 13:
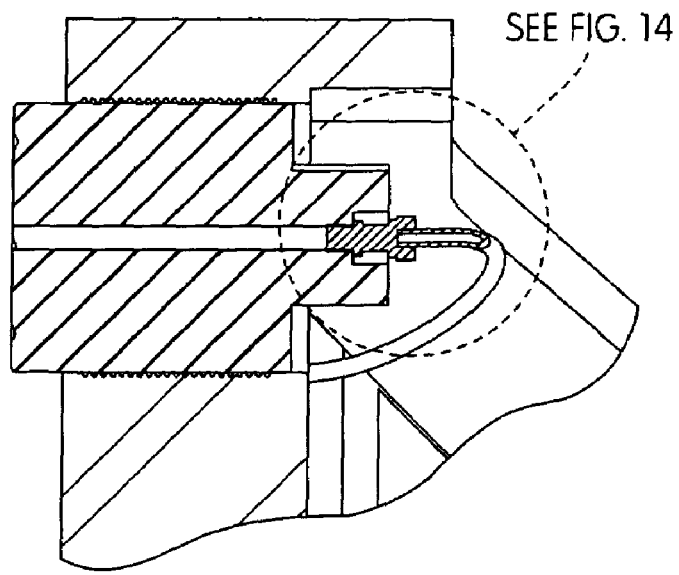
FIG. 13 is a section view taken along lines 13-13 in FIG. 12.
Figure 14:
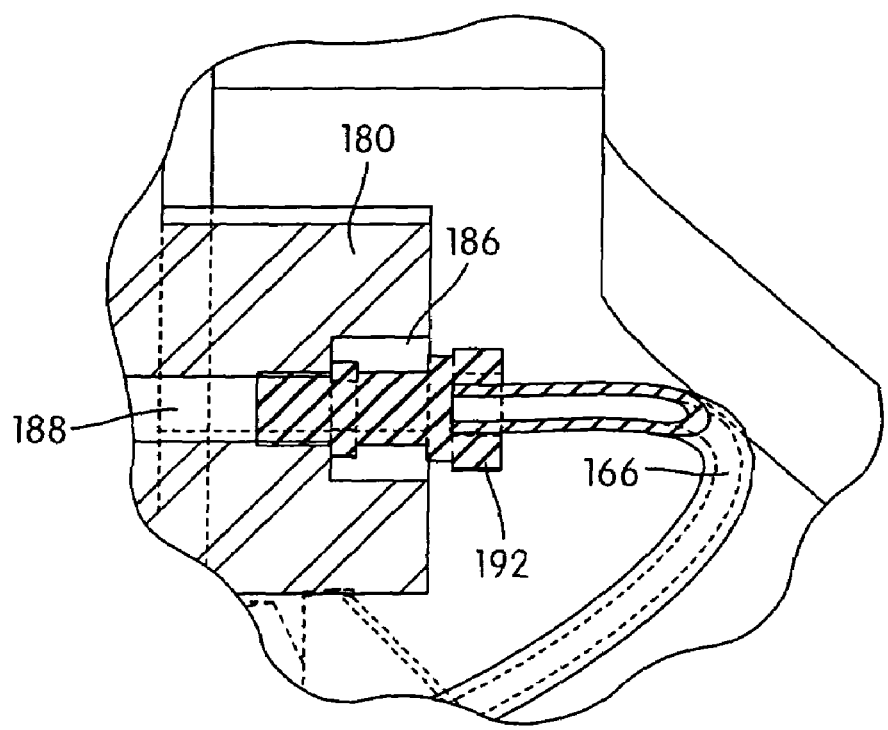
FIG. 14 is a close-up view of the circled portion thereof, illustrating a lateral blade stabilizer according to the invention.

Details as to the construction and mounting of the left-hand lateral blade stabilizer 122, the right-hand lateral blade stabilizer 124, and attachment of the individual lubricant output lines 166, 168 to them are illustrated in FIGS. 11-14. As illustrated in FIG. 11, the left-hand and right-hand lateral blade stabilizers are each manufactured as solid, generally cylindrical members. The stabilizers include an end-most blade abutment portion 176, an externally threaded shank portion 178, and a polygonal (e.g., square) bolt end 180. The blade abutment portion 176 may terminate in a slight frustro-conical beveled lubricant dispersion stand-off 182 that is on the order of 0.18 inch in height. As illustrated in FIGS. 13 and 14, the bolt end 180 has a central cavity or pocket 186 which protects the lubricant fittings 192, and a central, axially extending lubricant conduit 188 extends from the bottom of the socket 186 all the way through the blade stabilizer to the blade abutment portion 176, as shown in FIG. 11. The lubricant dispersion stand-off 182 has a diametrically extending lubricant dispersion groove 190 extending across it, and the central, axially extending lubricant conduit 188 communicates lubricant into it. The lateral blade stabilizers 122, 124 may be machined from steel, aluminum, bronze, or brass.

The left-hand and right-hand lateral blade stabilizers 122, 124 are screwed into internally threaded bores extending through the left-hand lower jaw plate 102a and the right-hand lower jaw plate 102b, respectively, generally above the pivot structure 106. Their positions are secured by placing a lock plate over each of the bolt ends and securing the lock plates to the side plates 102a and 102b, as is known in the art.

As further illustrated in those figures and in FIG. 12, the individual lubricant output lines 166, 168 are routed generally internally and secured to the internal structure of the stick structure 101 of the shears; they pass externally out through appropriately sized bores formed in the lower jaw side plates 102a and 102b, generally in the vicinity of the lateral blade stabilizers 122 and 124, as illustrated in FIGS. 3-7.

The lubricant output lines 166, 168 interconnect with the lateral blade stabilizers 122 and 124 by means of swiveling NPT (National Pipe Thread) compression fittings 192. The compression fittings 192 are crimped onto the ends of the lubricant output lines 166, 168, and their opposite, male ends are threaded into the axially extending lubricant conduits 188, as illustrated in FIGS. 13 and 14. With this arrangement, lubricant is applied to reduce wear between the arcuate wear portion 128 on the left side of the upper jaw 104 and the left-hand lateral blade stabilizer 122, and between the lateral surface of the arcuate wear member 130 and the right-hand lateral blade stabilizer 124 on the right side of the shears 100 by conveying lubricant through the lubricant conduits 188 and allowing it to be distributed over the surface of lubricant dispersion stand-offs 182 by means of the lubricant dispersion grooves 190.

Further details of the construction and arrangement of the guide blade 118 and the lower secondary cutting blade insert member 116, and the means by which they are lubricated by the lubricating system of the invention, are shown in FIGS. 3-7, 9, and 15-19. As illustrated in those figures, the guide blade 118 and the lower secondary cutting blade insert member 116 are both formed as prisms, with the guide blade being a generally hexagonal prism (i.e., its two major surfaces, which are the primary wear surfaces, are formed as hexagons) and the lower secondary cutting blade insert member being a generally rectangular prism (i.e., its two major surfaces, edges of which form the cutting edges, is formed as a rectangle), as is known generally in the art. (The guide blade could also be generally rectangular, if so desired.) The guide blade 118 and the lower, secondary cutting blade insert member 116 are seated against appropriately configured seating surfaces provided along the slot-facing surfaces of the left-hand lower jaw side plate 102a and the right-hand lower jaw side plate 102b, respectively, as is also generally known in the art.

Figure 15:
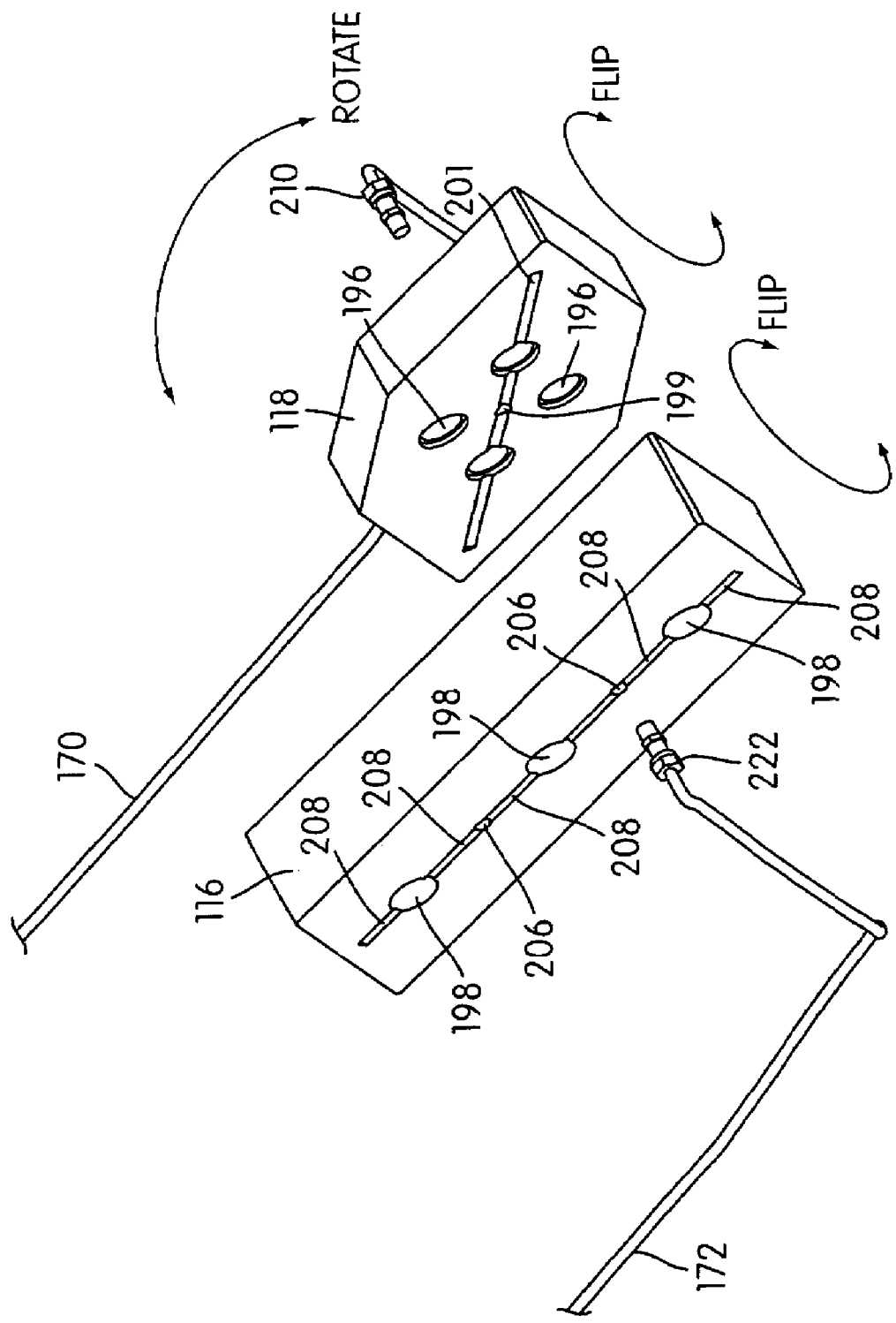
FIG. 15 is a perspective view illustrating a guide blade and a blade insert member configured for use with a lubricating system according to the invention.

The guide blade 118 and the lower secondary cutting blade insert member 116 (as well as the other cutting blade insert members, if desired) may be configured so they each can be flipped about their diagonal and longitudinal axes, respectively, so that both major surfaces of each can be presented, as illustrated in FIG. 15 and as is also generally known in the art. Additionally, the guide blade 118 and lower secondary cutting blade insert member 116 (as well as the other cutting blade insert members, if desired) may be configured so that they each can be rotated 180° about their respective transverse axes and re-seated against their respective seating surfaces, as also illustrated in FIG. 15 and as is also generally known in the art.

The guide blade 118 is secured against its seating surface 202 (FIG. 16) by means of plow bolts 194 (FIGS. 3 and 5) that pass through bolt holes 196 extending through the guide blade 118 and through the left-hand lower jaw side plate 102a, as is known in the art. Similarly, the lower secondary cutting blade insert member 116 is secured against a seating surface or, as shown, against an adjusting plate and shim arrangement 216 by means of plow bolts (not shown) that pass through bolt holes 198 extending through the blade insert member and through bolt holes extending through the right-hand lower jaw side plate 102b and the adjusting plate and shim 216, as is also known in the art.

Figure 16:
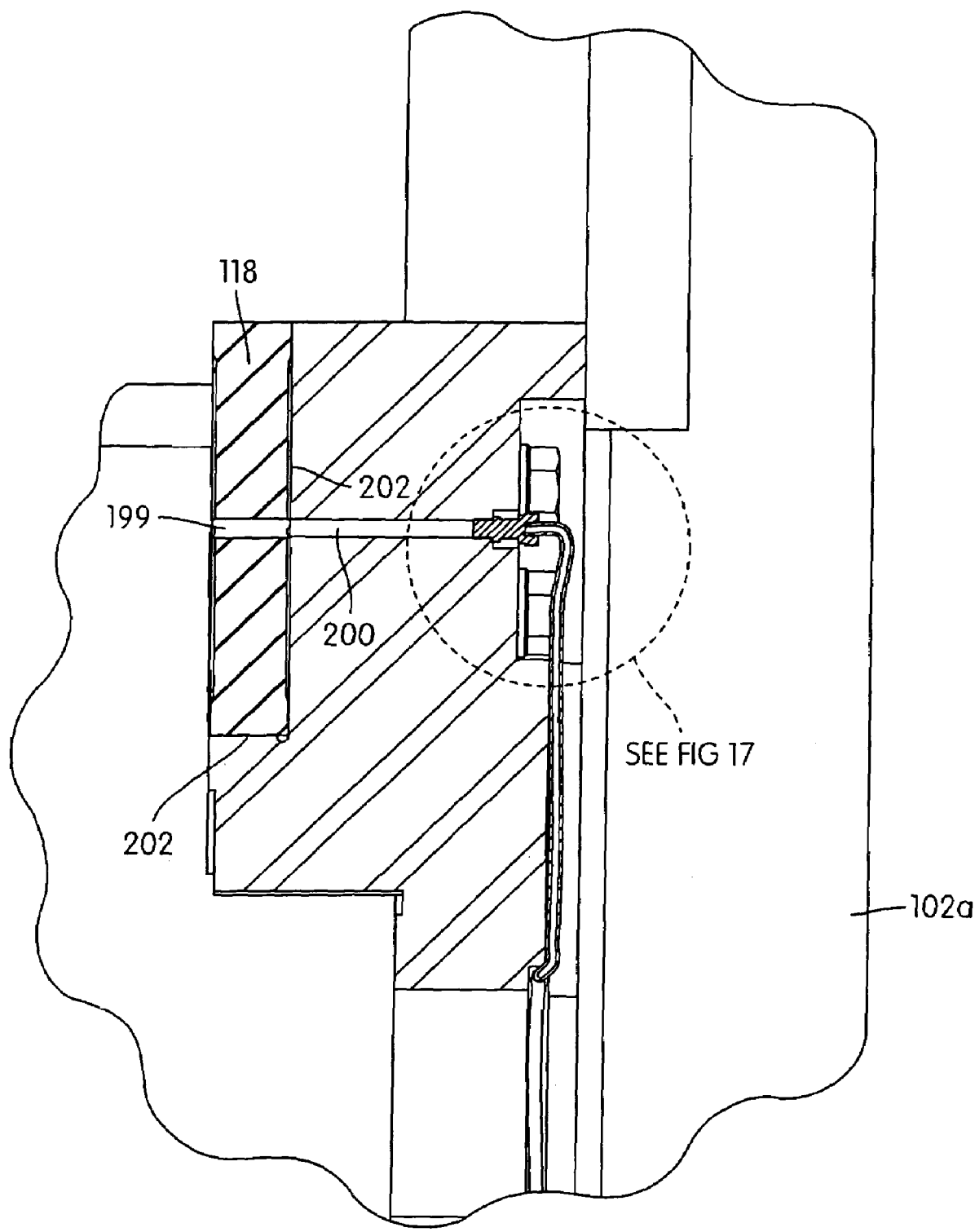
FIG. 16 is a section view taken along lines 16-16 in FIG. 12.
Figure 17:
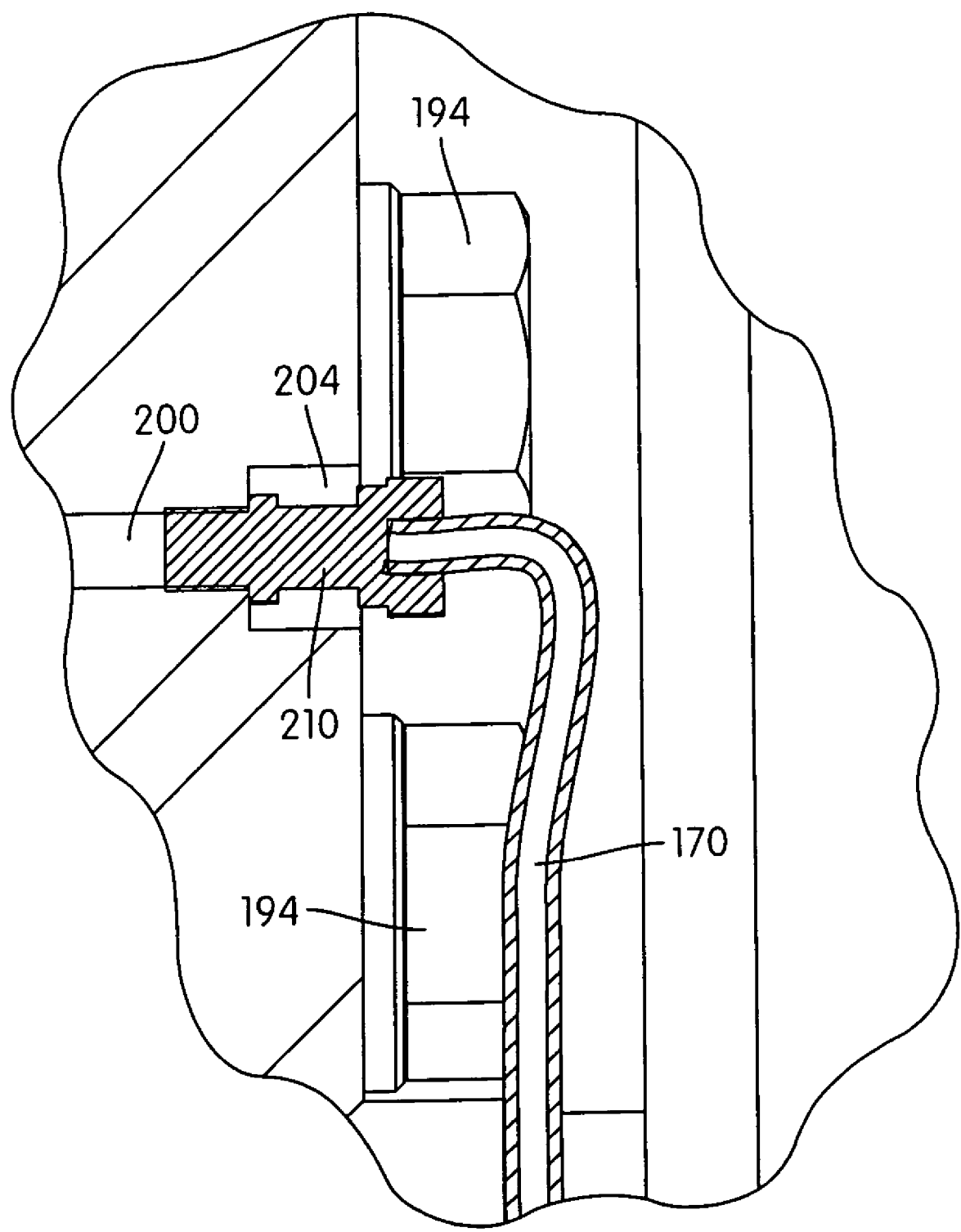
FIG. 17 is a close-up view of the circled portion thereof, illustrating a guide blade according to the invention.

As further illustrated in FIGS. 15-17, the guide blade 118 has a lubricant conduit 199 that extends laterally through the guide blade 118, along the axis of rotation, from one side (major surface) to the other side (major surface). On each side of the guide blade 118, a lubricant dispersion groove 201 is formed into which the lubricant conduit 199 distributes lubricant. The lubricant dispersion grooves 201 extend substantially along the diagonal length of both of the major surfaces of the guide blade 118.

Figure 18:
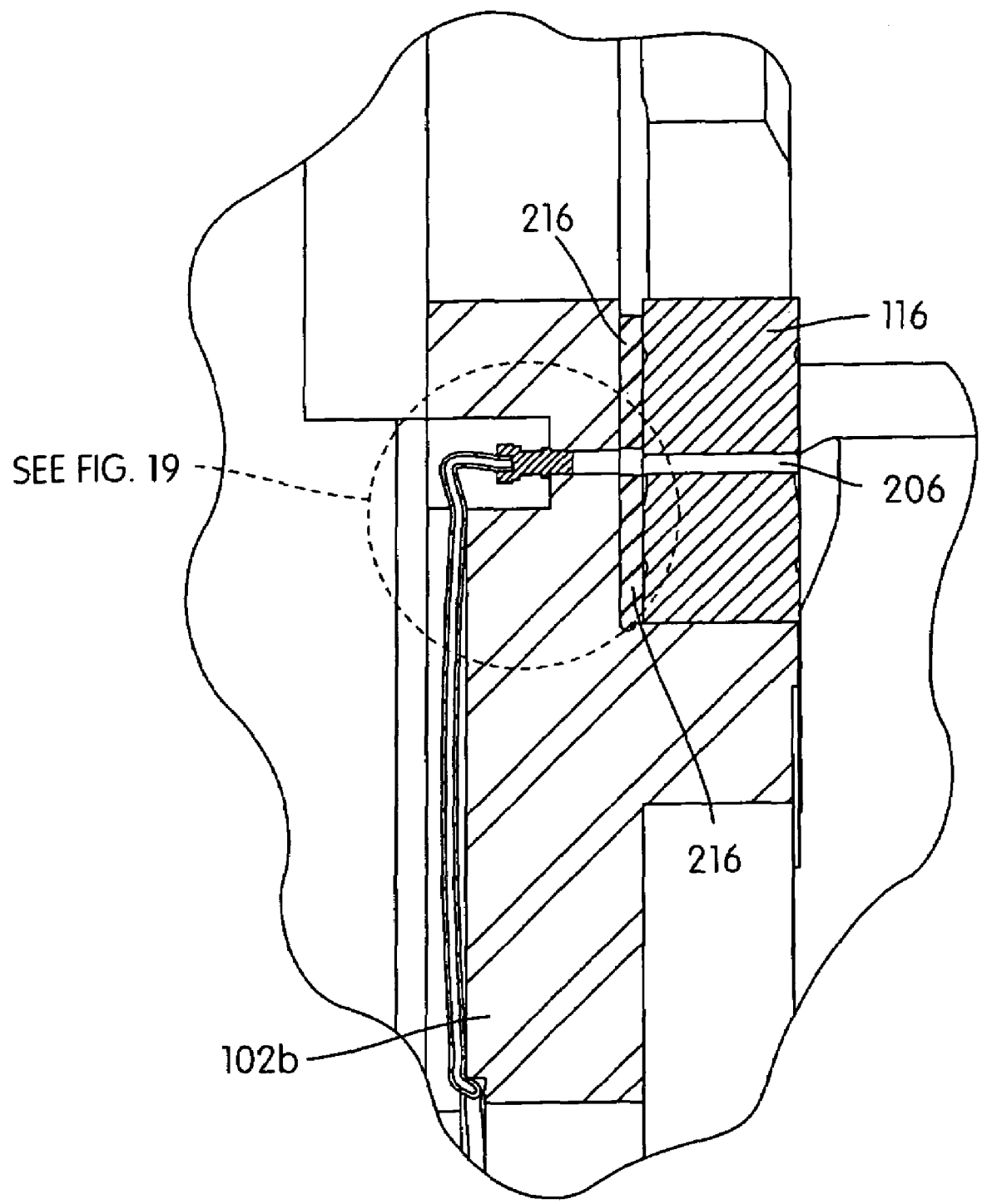
FIG. 18 is a section view taken along lines 18-18 in FIG. 12.
Figure 19:
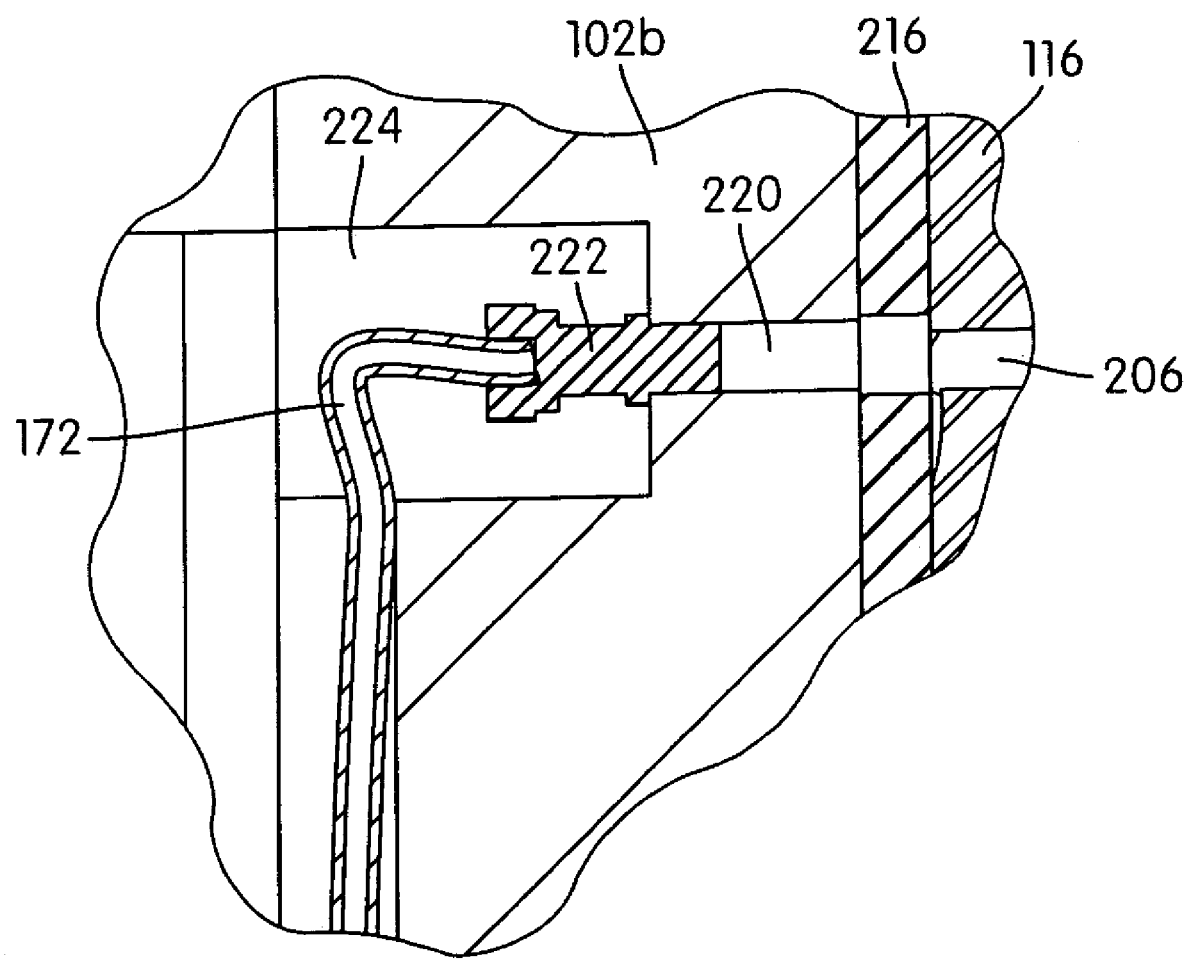
FIG. 19 is a close-up view of the circled portion thereof, illustrating a blade insert member according to the invention.

Similarly, as shown in FIGS. 15, 18, and 19, the lower secondary blade insert member 116 has one or more (in this case two) lubricant conduits 206 that extend laterally through the blade insert member 116, from one side (major surface) to the other side (major surface) of the blade insert member. The number and positioning of the lubricant conduits 206 may vary, depending on the number and arrangement of the bolt holes 198. Additionally, each side (major surface) of the blade insert member 116 has a lubricant dispersion groove 208 that extends longitudinally along the major surface of the blade insert member. As shown in FIG. 15, the lubricant conduit or conduits 206 terminate into the lubricant dispersion grooves 208 on each side of the blade insert member 116.

As illustrated in FIGS. 16 and 17, a lubricant channel 200 extends laterally outwardly from the seating surface 202 against which the guide blade 118 sits and terminates into a counterbore or cavity 204 that protects the fitting 210. As illustrated in FIG. 16, the guide blade 118 is seated against seating surface 202 with the central lubricant conduit 199 that extends through the guide blade 118 aligned with the lubricant channel 200 extending through the lower jaw side plate 102a. Externally, i.e., on the outer-facing side of the left-hand lower jaw side plate 102a, a compression fitting 210 is inserted into the counterbore or cavity 204, with the male end of the compression fitting 210 screws into the end of the lubricant channel 200. The compression fitting 210 is crimped onto the end of the individual lubricant output line 170. Thus, lubricant can be provided to the exposed wear surface of the guide blade 118 by being conveyed along individual lubricant output line 170, through the lubricant channel 200 formed in the lower jaw side plate 102a, through the lubricant conduit 199 extending through the guide blade 118, and then being distributed along the lubricant dispersion groove 201. As the upper jaw pivots open and closed, and the wear plate 120 slides past the guide blade 118, lubricant will be distributed over the exposed surfaces of both the guide blade 118 and the wear plate 120, thus reducing friction and hence wear on those parts.

Similarly, as illustrated in FIGS. 18 and 19, a lubricant channel 220 extends laterally through the lower right-hand jaw side plate 102b. The lower secondary blade insert member 116 is seated against a seating surface or, as shown, an adjusting plate and shim 216, with lubricant conduit 206 extending through the blade insert member 116, aligned with lubricant conduit 220, and extending through the lower jaw side plate 102b and through the adjusting plate and shim 216. A swiveling NPT compression fitting 222 is crimped onto the end of individual lubricant output line 172. The lubricant compression fitting 222 fits within pocket 224, which protects the fitting, and the male end of the compression fitting 222 screws into the end of the lubricant conduit 220.

With this arrangement, lubricant is provided to the exposed major surface of the blade insert member 116 by being provided along lubricant output line 172 and flowing through lubricant channel 220 (in the lower jaw side plate 102b) and lubricant conduit 206 (through the blade insert member), then being distributed along the exposed lubricant dispersion groove 208. As the upper jaws opens and closes and the upper secondary blade insert member moves past the lower secondary blade insert member, lubricant will be spread over the major exposed surfaces of both, thereby reducing frictional wear and extending service life of the parts.

Figure 7:
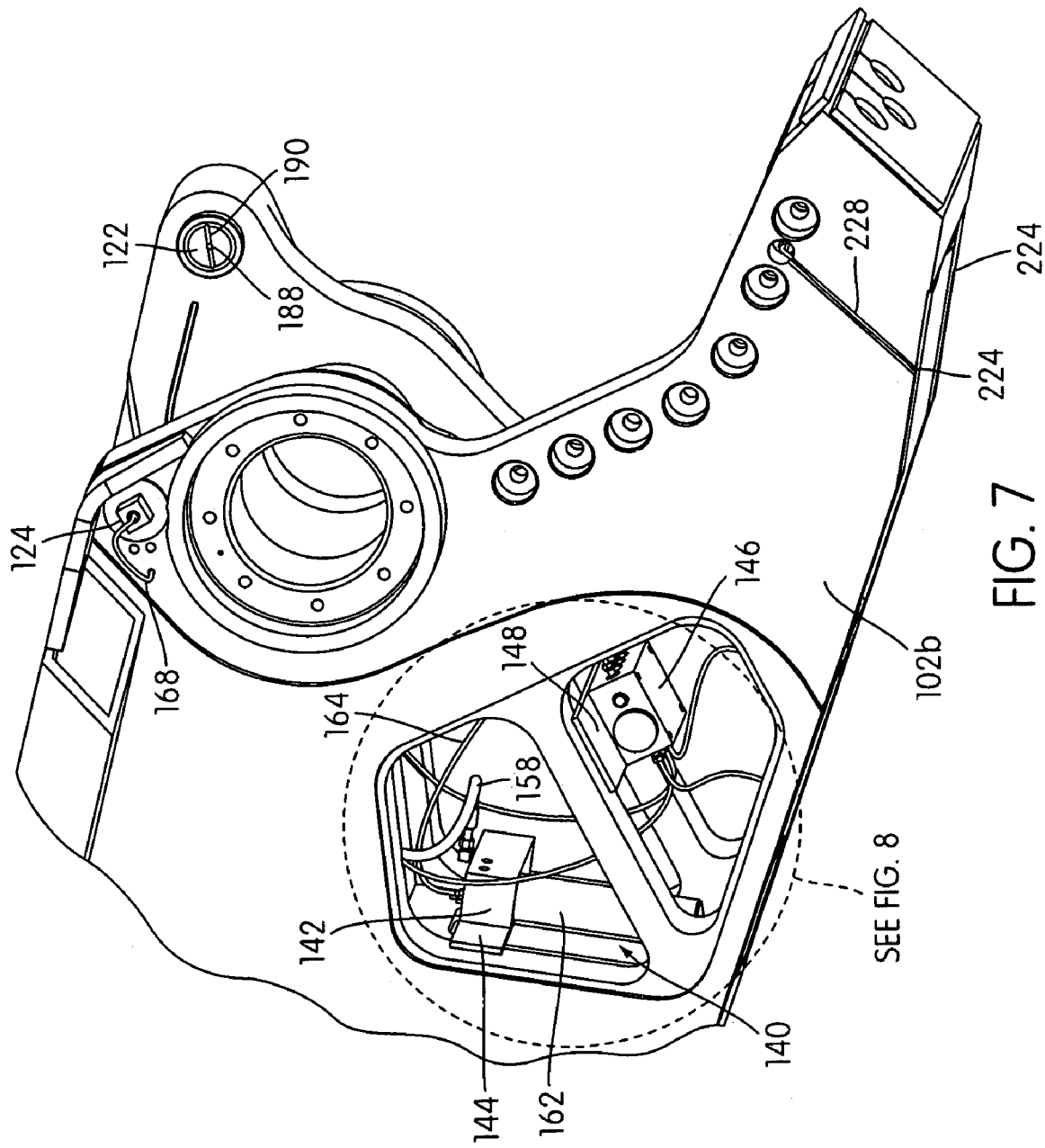
FIG. 7 is a perspective view of the lower jaw assembly of a heavy-duty metal demolition shears, without the upper jaw assembly or pivot group installed, incorporating a lubricating system according to the invention.
Figure 8:
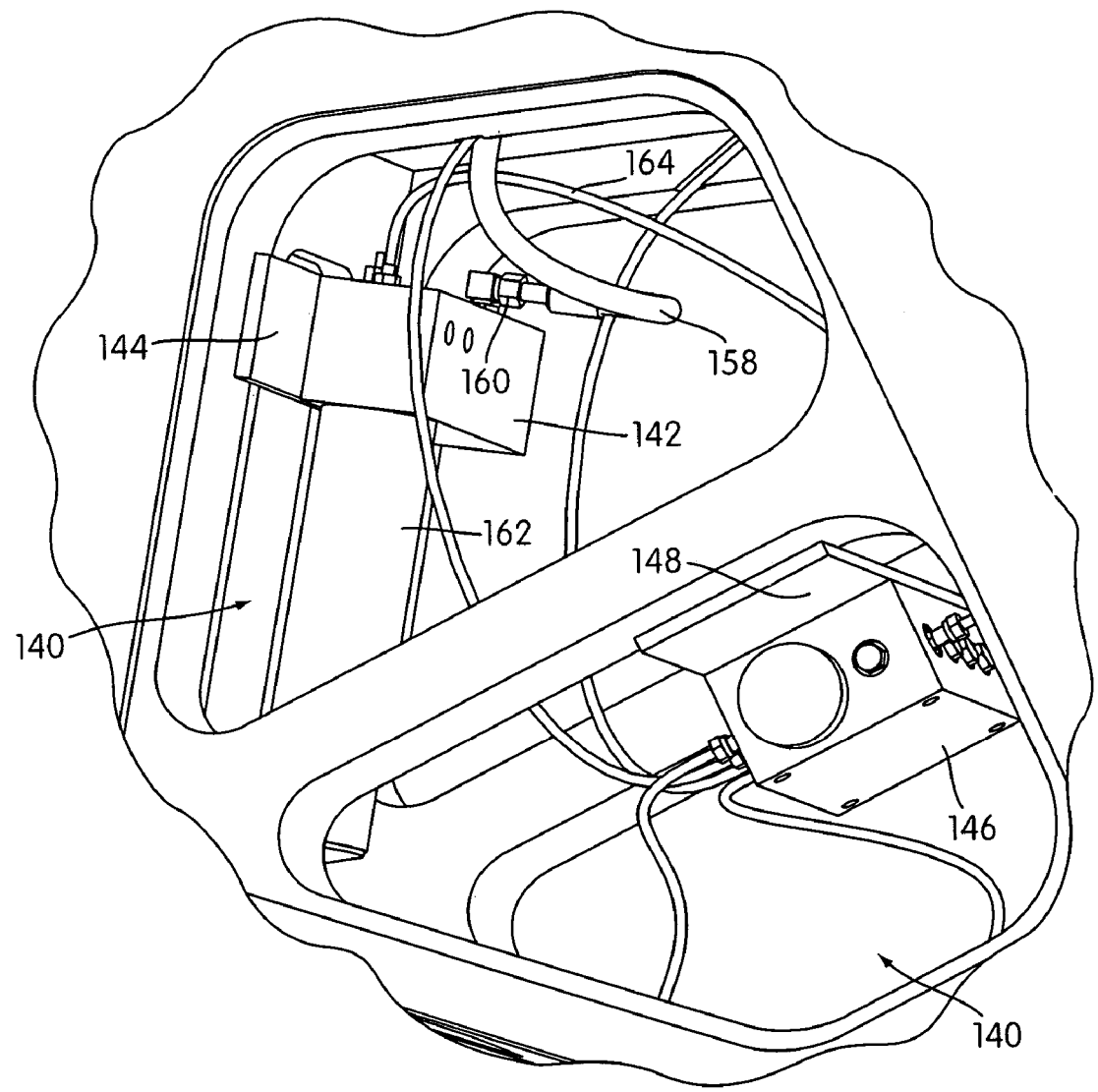
FIG. 8 is a close-up view illustrating components of the lubricating system.

As illustrated, for example, in FIGS. 7 and 12, the lubricant output lines 170 and 172 are routed generally internally through the structure of the jaws. They then exit through lubricant output line exit ports 224 on either side of the jaws and extend along lubricant output line guide channels 226 and 228 formed in the outer surfaces of the left-hand and right-hand lower jaw side-plates 102a and 102b, respectively.

FIGS. 20-24 illustrate heavy-duty metal demolition shears 300 according to another embodiment of the present invention. The shears 300 are generally similar to the above-described shears 100 except that a lubricating system 340 provides lubricant to wear portions (e.g., wear parts, portions of parts of the shears 300, etc.) via an upper jaw 304 instead of a lower jaw 302. Accordingly, a detailed description of the generally redundant features (including, among other features, upper and lower jaws, a stick, a lubricant pump, an SSV valve, and the functional and structural relationship between various components) is omitted.

Figure 20:
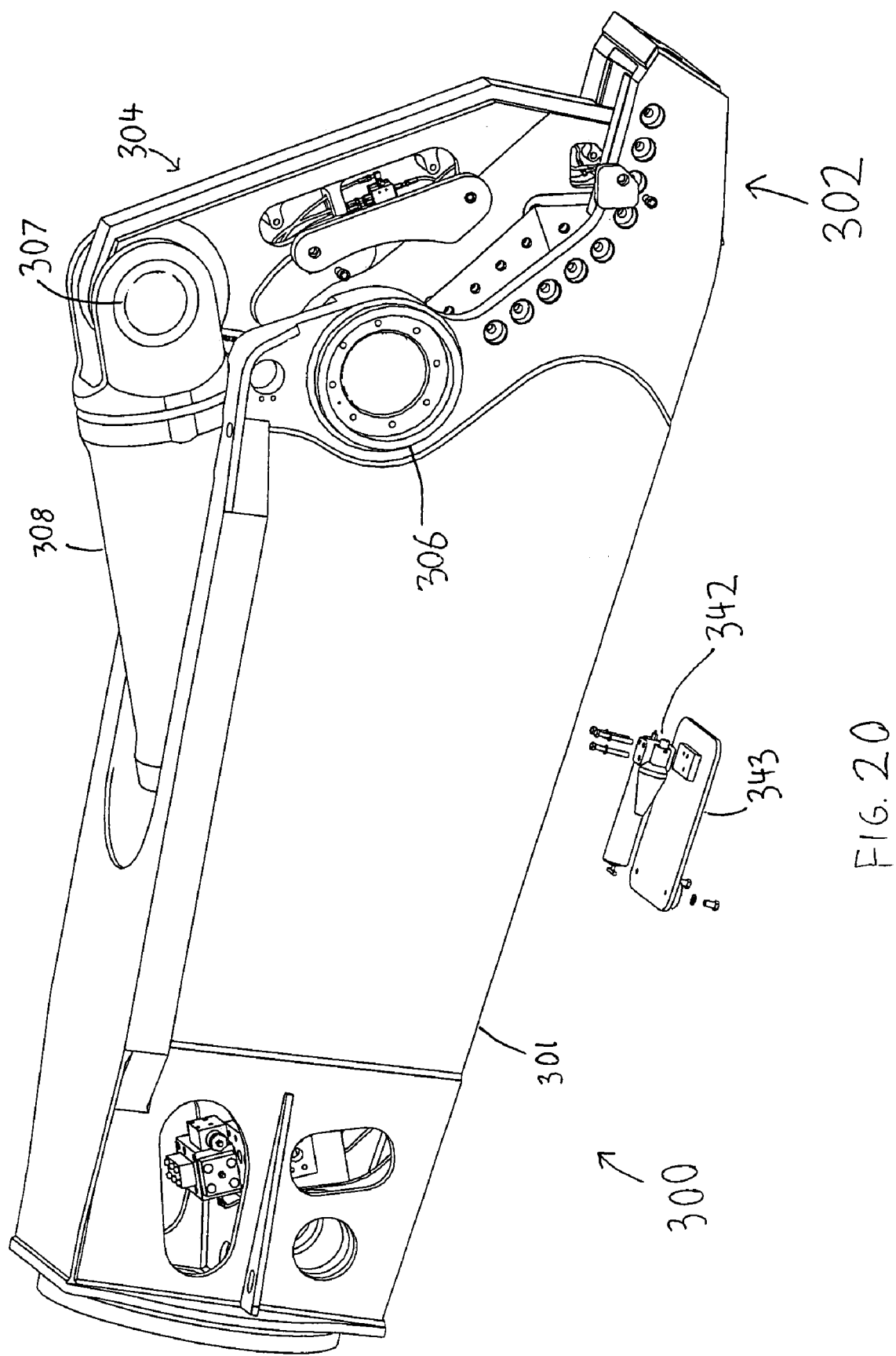
FIG. 20 is a partially-exploded, perspective view of the right side of a closed shears according to an alternative embodiment of the present invention.

As shown in FIG. 20, the upper and lower jaws 304, 302 pivotally connect to each other at a pivot structure 306. A hydraulic cylinder 308 pivotally connects to the upper jaw 304 at a pivot structure 307. The hydraulic cylinder 308 also pivotally connects to a body 301 or "stick" of the shears 300. The pivot structures 306, 307 include pins and mating bores to allow relative pivotal movement. The hydraulic cylinder 308 drives the upper jaw 304 open and closed relative to the lower jaw 302.

Figure 21:
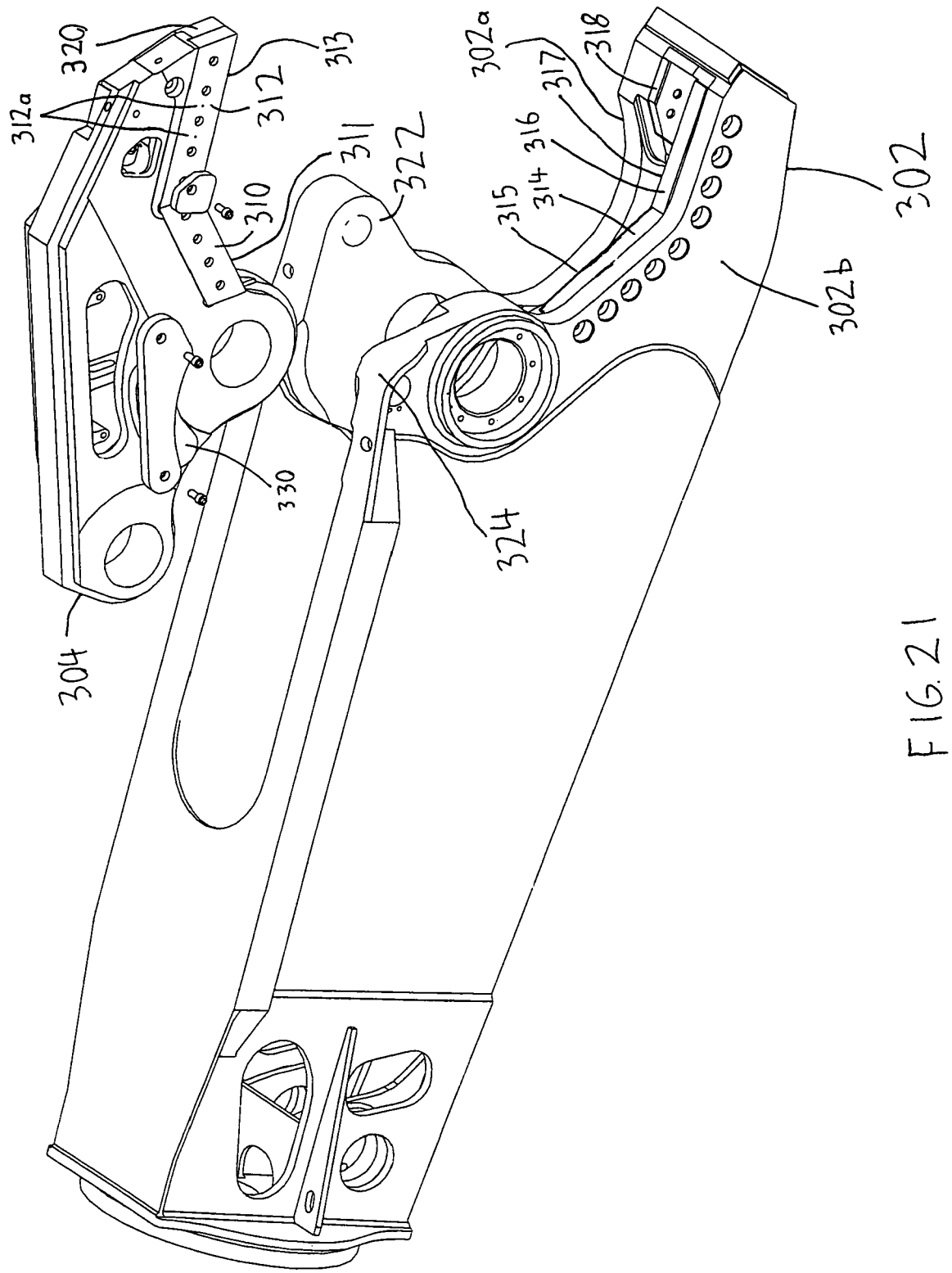
FIG. 21 is a partially-exploded, perspective view of the right side of the shears in FIG. 20 in an open position.

As shown in FIG. 21, upper primary and secondary blade insert members 310, 312, respectively, are secured to a blade seat portion of the upper jaw 304 and provide primary and secondary upper cutting edges 311, 313, respectively. Similarly, lower primary and secondary blade insert members 314, 316, respectively, are secured to seating surfaces formed along the right-hand lower jaw side plate 302b and provide primary and secondary lower cutting edges 315, 317, respectively. A wear guide or guide blade 318 is attached to an inner, slot-facing seat formed along left-hand side plate 302a opposing the lower primary and secondary blade insert members, and a forward wear plate 320 or piercing tip is attached to a lateral surface at a front, nose portion of the upper jaw 304.

As shown in FIG. 21, the shears 300 also includes a left-hand lateral blade stabilizer 322 and a right-hand lateral blade stabilizer 324. As the upper jaw 304 pivots open and closed, depending on lateral forces on the upper jaw 304, wear surfaces of the left-hand lateral blade stabilizer 322 will make sliding contact along an arcuate wear surface 328 on the left side of the upper jaw 304 (see FIG. 22), and a wear surface of the right-hand lateral blade stabilizer 324 will make sliding contact along the surface of an arcuate wear member 330.

As shown in FIGS. 23 and 24, a lubricating system 340 includes a pump 342 (see FIGS. 20, 24) and an SSV valve (sequential lubricant distributor) 346 (see FIG. 23). As shown in FIG. 20, the pump 342 mounts inside the body 301 on an access plate 343. The pump 342 may alternatively be disposed at any other convenient position, as would be understood by one of ordinary skill in the art (e.g., in/on the upper jaw 304, external to the shears 300, etc.). The pump 342 is preferably driven by a hydraulic control line 350 similar to the previously-described hydraulic control line 150.

As shown in FIG. 23, the SSV valve 346 is mounted within the upper jaw 304 and is accessible via a removable access hatch 347. The pump 342 provides lubricant to the SSV valve 346 via a primary lubricant output line 364 that extends between the pump 342 and the SSV valve 346.

As shown in FIG. 23, lubricant is channeled from the SSV valve 346 to various wear surfaces on various wear parts of the shears 300 via a plurality of lubricant output lines 367. The output lines 367 fluidly communicate with a lubricant port 330a in the arcuate wear member 330, a lubricant port 307a within a bore on the upper jaw 304 that defines a part of the pivot structure 307, a lubricant port 306a within a bore on the upper jaw that defines a part of the pivot structure 306, a lubricant port 328a in the arcuate portion 328 (see FIG. 22), lubricant ports 312a on the secondary blade insert 312 (see FIG. 21), and lubricant ports 320a on the wear plate 320 (see FIG. 22). The lubricating system 340 may alternatively and/or additionally provide lubricant to any point of friction on the shears 300 without deviating from the scope of the present invention (e.g., a pivotal structure connecting the cylinder 308 to the body 301, a forward edge of the wear plate 320, the primary blade 310, any of the mating wear surfaces on the lower jaw 302 or body 301, etc.). As in the shears 100, various dispersion grooves, channels, passages, etc. may be disposed on these wear surfaces to improve dispersion of the lubricant over the various wear surfaces (see, e.g., FIG. 9). Provision of lubricant to such wear surfaces improves the efficiency of the cutting action of the shears 300 and increases the useful life of such wear parts.

To fluidly connect the lubricant supply lines 367 to the lubricant ports 306a, 307a, 312a, 320a, 328a, 330a, various bores, machined passages, drilled passages, channels, fluid lines, tubes, plugs, etc. may be used. Such fluid paths may be formed by machining grooves in laminates that are subsequently sandwiched together to form passages. For example, as shown in FIG. 25, two lubricant supply lines 367 extend through passages 390 in the upper jaw 304. These passages 390 are formed by machining a channel into a side of the upper jaw 304 and covering the machined channel with a side plate. Additionally and/or alternatively, various interconnecting holes may be drilled and plugged to form the passages, as discussed below. Lubricant passages are preferably formed in low stress areas of the shears 300 (e.g., at or near the center of a structural component) so that they do not significantly affect the strength of such components. Any other suitable type of fluid path may be additionally and/or alternatively incorporated into the lubricant output conduit to direct lubricant to the lubricant ports 306a, 307a, 312a, 320a, 328a, 330a.

Lubricant is provided to the lubricant port 307a from a lubricant supply line 367 via two bores 369 in the upper jaw 304 (see FIG. 22) and an intermediate supply line 371 that fluidly connects the bores 369 (see FIG. 23).

As shown in FIGS. 25, 26, and 27, the lubricant supply line 367 fluidly connects to the lubricant port 320a in the wear plate 320 via interconnecting longitudinal, vertical, and transverse bores 400, 410, 420 in the upper jaw 304 and a mating transverse bore 430 in the wear plate 320. As shown in FIG. 25, an upper opening of the bore 410 and a forward opening of the bore 400 are plugged to prevent lubricant from escaping therethrough. As shown in FIG. 27, the bores 420, 430 are aligned with each other when the wear plate 320 is mounted to the upper jaw 304 such that lubricant flows from the supply line 367 to the port 320a via the bores 400, 410, 420, 430.

As shown in FIGS. 25 and 28, the lubricant supply line 367 fluidly connects to the lubricant port 312a in the secondary blade 312 via interconnecting vertical and transverse bores 450, 460 in the upper jaw 304 and a mating transverse bore 470 in the secondary blade 312. A lower opening of the bore 450 is plugged. The bores 460, 470 align with each other when the secondary blade 312 is mounted to the upper jaw 304 such that lubricant flows from the supply line 367 to the port 312a via the bores 450, 460, 470.

A lubricant output conduit extends from the lubricant pump 342 to lubricant ports 306a, 307a, 312a, 320a, 328a, 330a on the wear surfaces of various wear portions of the shears 300. The illustrated lubricant output conduit includes the lubricant output lines 367, SSV valve 346, the lubricant output line 364, lubricant ports 306a, 307a, 312a, 320a, 328a, 330a, various conduit fittings, connectors, various bores (e.g., bores 400, 410, 420, 430, 440, 450, 460, 470), machined passages, channels, fluid lines, and/or plugs. However, one or more of these portions of the lubricant output conduit may be omitted without deviating from the scope of the present invention. For example, some fluid passageways to specific ones of the lubricant ports 306a, 307a, 312a, 320a, 328a, 330a may include greater or fewer conduit components.

The lubricating system 340 may be retrofitted onto a conventional non-lubricating shears by replacing a conventional upper jaw with the upper jaw 304. The pump 342 and associated supply line 364 may be disposed at any convenient position and operatively connected to a hydraulic control line. In this manner, lubricant can efficiently and cost-effectively be provided to a conventional non-lubricating shears.

With this arrangement, the various wear parts and wear surfaces can be automatically lubricated while a metal demolition shears is being operated. This extends the service life of the various wear parts and increases productivity by eliminating the need to stop operation every time it is desired to lubricate the various wear parts. Although a specific embodiment of the invention has been disclosed and described for illustrative purposes, various modifications to and departures from the disclosed embodiment will occur to those having skill in the art. For example, a lubricating system according to the invention might also be extended to apply grease or other lubricant to the main pivot structure of the demolition shears, or to some other region of the shears that makes sliding or frictional contact and that is subject to wear. Those and other such departures from the disclosed embodiments are deemed to be within the scope of the following claims.

What is claimed is:

1. A blade insert member for use in a heavy-duty metal demolition shears, the blade insert member comprising:
    a body having a securing region that enables the blade insert member to be secured in an operative position to the heavy-duty metal demolition shears; and
    a lubricant conduit defined by the body and terminating at a shearing wear surface of the blade insert member, the lubricant conduit being positioned to mate with a corresponding lubricant supply conduit of the heavy-duty metal demolition shears.

2. The blade insert member of claim 1, further comprising a lubricant dispersion groove formed along the shearing wear surface and fluidly connected to the lubricant conduit.

3. The blade insert member of claim 1, wherein the blade insert member comprises a piercing tip.

4. The blade insert member of claim 3, wherein the blade insert member is configured such that it can be rotated by 180° about a central, transverse axis and reseated against the seating surface of the first jaw.

5. The blade insert member of claim 3, wherein the shearing wear surface is disposed on a forward side of the piercing tip.

6. The blade insert member of claim 1, wherein the securing region comprises a bolt hole.

7. The blade insert member of claim 6, wherein the lubricant conduit is spaced from the bolt hole.

8. The blade insert member of claim 7, wherein the lubricant conduit has a substantially smaller cross-sectional area than the bolt hole.

9. The blade insert member of claim 6, wherein the lubricant conduit extends through the bolt hole.

10. The blade insert member of claim 1, wherein the blade insert member comprises a primary blade insert member.

11. The blade insert member of claim 1, wherein the blade insert member comprises a guide blade.

12. The blade insert member of claim 1, wherein the blade insert member comprises a forward cross-member, and wherein the shearing wear surface is disposed on an inner surface of the forward cross-member.

13. The blade insert member of claim 1, wherein the lubricant conduit comprises a bore that extends through the body.

14. The blade insert member of claim 1, wherein the lubricant conduit comprises a groove in the body.

15. The blade insert member of claim 1, wherein the shearing wear surface is disposed on a lateral side of the blade insert member.

16. The blade insert member of claim 1, in combination with the heavy-duty metal demolition shears, the shears comprising:
    a first jaw with a seating surface against which the blade insert member is seated, the first jaw having the lubricant supply conduit, the lubricant supply conduit being in fluid communication with the lubricant conduit, and
    a second jaw movable relative to the first jaw between open and closed positions.

17. A blade insert member for use in a heavy-duty metal demolition shears, the blade insert member comprising:
    a body having a securing region that enables the blade insert member to be secured in an operative position to the heavy-duty metal demolition shears; and
    a lubricant conduit disposed in the body for directing lubricant to the wear surface, the lubricant conduit being positioned to mate with a corresponding lubricant supply conduit of the heavy-duty metal demolition shears.

18. The blade insert member of claim 17, wherein the body of the blade insert member includes a cutting edge.

19. A wear part for use in a heavy-duty metal demolition shears, said wear part comprising:
    a prismatic body having a pair of parallel, polygonal, major surfaces on opposite sides thereof;
    at least one bolt hole by means of which said wear part can be secured in an operative position to said heavy-duty metal demolition shears; and
    a lubricant conduit extending through said wear part and terminating at at least one of said major surfaces.

20. The wear part of claim 19, further comprising a lubricant dispersion groove formed along said at least one major surface at which said lubricant conduit terminates, said lubricant conduit terminating into said lubricant dispersion groove.

21. The wear part of claim 20, further comprising a second lubricant dispersion groove formed along the other of said pair of major surfaces, said lubricant conduit also terminating into said second lubricant dispersion groove, said wear part being configured such that it can be flipped about a longitudinally oriented axis and reseated against the seating surface of the shears, whereby both major surfaces and both lubricant dispersion grooves can be presented during operation of the shears by flipping and reseating the wear part.

22. The wear part of claim 19, wherein the wear part comprises a blade insert member that includes a cutting edge.

* * * * *